(12) United States Patent
Lavrik et al.

(10) Patent No.: US 12,435,039 B2
(45) Date of Patent: Oct. 7, 2025

(54) ACTIVATORS OF CASPASE-8/C-FLIP$_L$ DIMERIZATION AND THEIR USE IN CANCER THERAPY

(71) Applicant: Inna Lavrik, Magdeburg (DE)

(72) Inventors: Inna Lavrik, Magdeburg (DE); Laura Hillert, Magdeburg (DE); Nikita Ivanisenko, Magdeburg (DE); Vladimir Ivanisenko, Magdeburg (DE)

(73) Assignee: Inna Lavrik, Magdeburg (DE)

( * ) Notice: Subject to any disclaimer, the term of this patent is extended or adjusted under 35 U.S.C. 154(b) by 872 days.

(21) Appl. No.: 17/262,978

(22) PCT Filed: Jul. 16, 2019

(86) PCT No.: PCT/EP2019/069088
§ 371 (c)(1),
(2) Date: Jan. 25, 2021

(87) PCT Pub. No.: WO2020/020700
PCT Pub. Date: Jan. 30, 2020

(65) Prior Publication Data
US 2022/0363641 A1     Nov. 17, 2022

(30) Foreign Application Priority Data

Jul. 25, 2018 (DE) .......................... 102018118038.1

(51) Int. Cl.
| C07D 213/56 | (2006.01) |
| C07C 311/16 | (2006.01) |
| C12Q 1/37 | (2006.01) |
| A61P 35/00 | (2006.01) |

(52) U.S. Cl.
CPC .......... *C07D 213/56* (2013.01); *C07C 311/16* (2013.01); *C12Q 1/37* (2013.01)

(58) Field of Classification Search
CPC ....... C07D 213/56; C07C 311/16; C12Q 1/37; G01N 2333/96413; A61P 35/00
See application file for complete search history.

(56) References Cited

U.S. PATENT DOCUMENTS

2010/0297145 A1    11/2010  Tsujikawa et al.

FOREIGN PATENT DOCUMENTS

| EP | 1932541 A1 | 6/2008 |
| WO | 2010/006177 A2 | 1/2010 |

OTHER PUBLICATIONS

STN Database, Enamine Chemical Library, RN 380335-00-2, entered in STN Jan. 3, 2002 (Year: 2002).*
Enamine Store, https://enaminestore.com/catalog/EN300-18216762, catalog ID EN300-18216762; Enamine Compound Management, https://enamine.net/services/compound-library-management, see also attached PDF. (Year: 2024).*
Baran PS. Natural Product Total Synthesis: As Exciting as Ever and Here To Stay. J Am Chem Soc. Apr. 11, 2018;140(14):4751-4755. doi: 10.1021/jacs.8b02266. PMID: 29635919. (Year: 2018).*
Dorwald F. Z. Side Reactions in Organic Synthesis, IX Preface, 2005 (Year: 2005).*
Enamine Chemical Library Supplier (Enamine Store, Catalog ID EN300-18216762, RN 380335-00-2 and Enamine Compound Library Management), 2002 (Year: 2002).*
CAS, RN 380335-00-2, 2002 (Year: 2002).*
Carey, J.P. et al. "Transcription factor, Id4, induced cellular reprogramming of cancer cells using an advanced prostate cancer cell model," Poster 590, European Journal of Cancer, Supplement, Pergamon, Oxford, GB, vol. 8, No. 7, pp. 185-186, Nov. 1, 2010. Pubchem: "2-[(4-Phenylbenzoyla)amino]ethyl 3-(benzylsulfamoyl)benzoate" retrieved from the internet.
Schimmer, Aaron D. et al. "Small-molecule antagonists of apoptosis suppressor XIAP exhibit broad antitumor activity," Cancer Cell, vol. 5, No. 1, pp. 25-35, Jan. 1, 2004.
Schleich, K. et al. "Molecular architecture of the DED chains at the DISC: regulation of procaspase-8 activation by short DED proteins c-FLIP and procaspase-8 prodomain, Cell Death and Differentiation," vol. 23, No. 4, pp. 681-694, Oct. 23, 2015.
Neumann, Leo et al. "Dynamics within the CD95 death-inducing signaling complex decide life and death of cells." Molecular Systems Biology 6(352):1-17, (Year: 2010).
Salvesen, Guy S. & Walsh, Craig M. "Functions of Caspase 8: The identified and the mysterious." Seminars in Immunology 26(3):246-252, (Year: 2014).
Yu, Jong W. et al. "Mechanism of procaspase-8 activation by c-FLIPL." PNAS 106(20):8169-8174, May 19, 2009.
Office action issued by the German Patent Office dated Jan. 8, 2019 with respect to the German priority application No. 10 2018 118 038.1.
Office action issued by the German Patent Office dated Feb. 16, 2023 with respect to the German priority application No. 10 2018 118 038.1.

* cited by examiner

*Primary Examiner* — Jeffrey H Murray
*Assistant Examiner* — Kevin S Martin
(74) *Attorney, Agent, or Firm* — SALIWANCHIK, LLOYD & EISENSCHENK

(57) ABSTRACT

The present invention relates to activators of caspase-8/c-FLIP$_L$ dimerization and their use in enhancing the pro-apoptotic activity of the heterodimer and cancer therapy.

Figure 1:
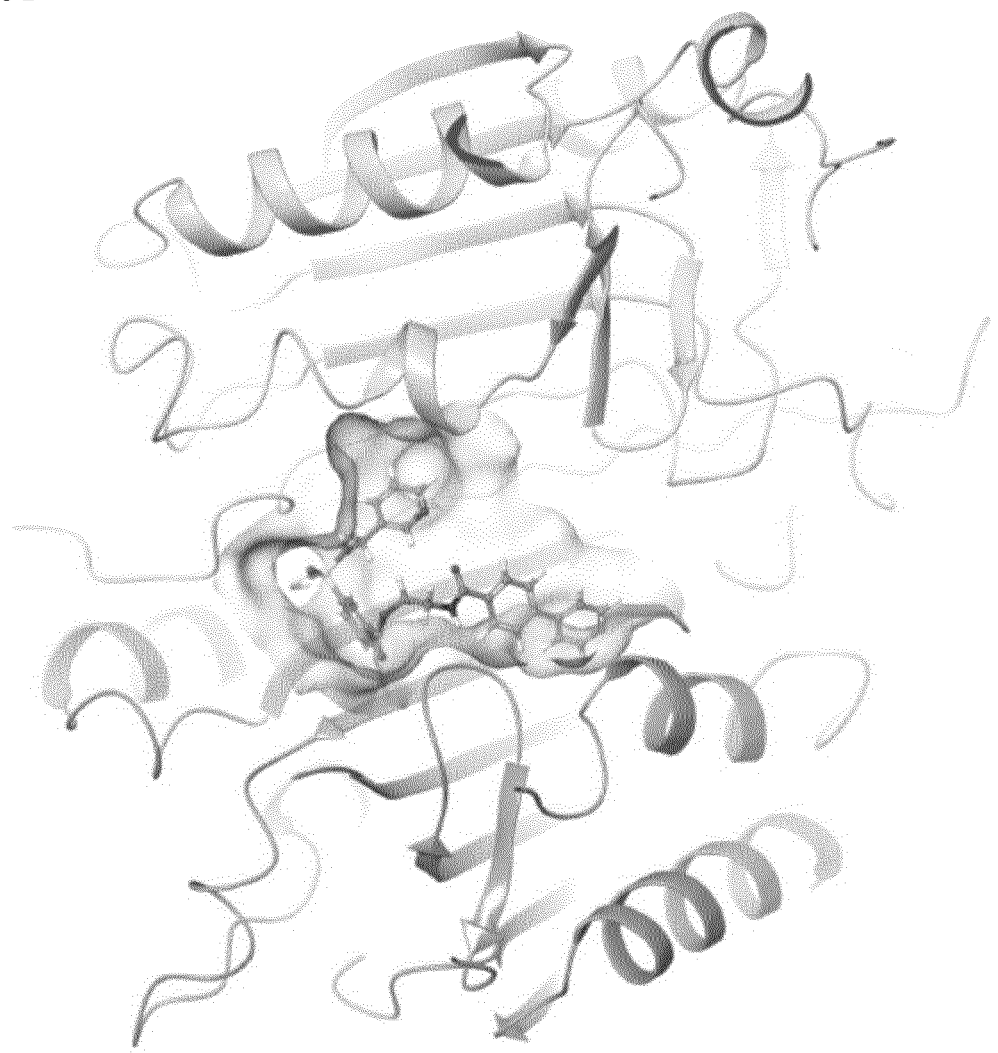
Figure 1:
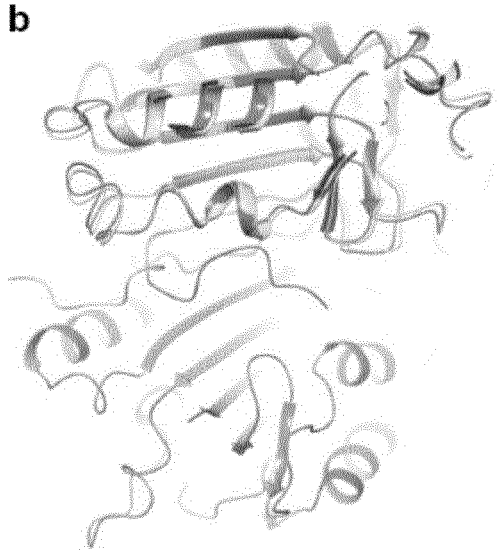
Figure 1:
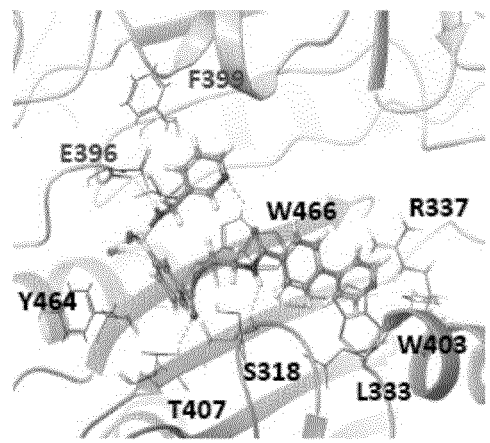

2 Claims, 9 Drawing Sheets a b

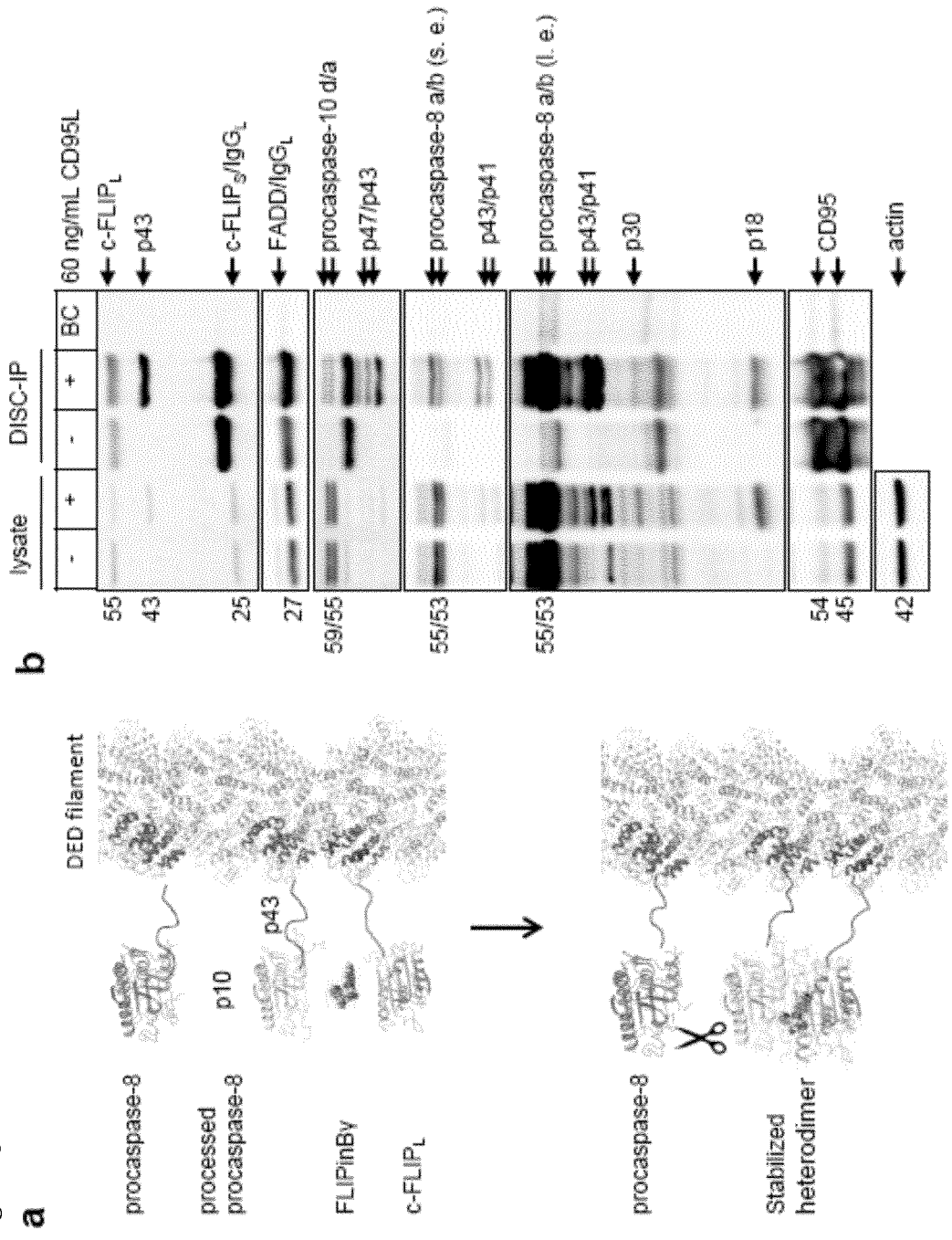

a b

ACTIVATORS OF CASPASE-8/C-FLIP$_L$ DIMERIZATION AND THEIR USE IN CANCER THERAPY

CROSS REFERENCE TO RELATED APPLICATIONS

This application is a National Stage Application of International Application Number PCT/EP2019/069088, filed Jul. 16, 2019; which claims priority to German Application No. 102018118038.1, filed Jul. 25, 2018.

The present invention relates to activators of caspase-8/c-FLIP$_L$ dimerization and their use in enhancing the pro-apoptotic activity of the heterodimer and cancer therapy.

BACKGROUND OF THE INVENTION

Apoptosis is the program of cell death that is essential for all multicellular organisms. An apoptotic signal is induced by a variety of factors including death receptor (DR) activation (Krammer, Arnold and Lavrik, 2007).

The apoptotic DR signaling cascade is triggered by the activation of a corresponding DR by the cognate death ligand (DL), in particular, CD95/Fas or TRAIL-R1/2, by CD95L/FasL or TRAIL, respectively, which results in the formation of a death-inducing signaling complex (DISC).

DISC comprises DR, FADD, procaspases-8, to and c-FLIP, serving a central platform for procaspase-8 activation which initiates the subsequent apoptotic response (Lavrik and Krammer, 2012).

The molecular architecture of the DISC is designated by a framework of strictly defined interactions between death domains (DDs) and death effector domains (DEDs).

Recently, it has been shown that procaspase-8 at the DISC forms so-called DED chains or filaments via DED interactions which serve as a platform for dimerization and subsequent activation of procaspase-8 (Dickens et al., 2012; Schleich et al., 2012).

Initiation of caspase-8 activation at the DISC and DED chains/filaments are largely controlled by c-FLIP proteins (Öztürk, Schleich and Lavrik, 2012). Three c-FLIP isoforms including Long (L), Short (S), and Raji (R), i.e., c-FLIP$_L$, c-FLIP$_S$, and c-FLIP$_R$ and two cleavage products have been characterized so far (Scaffidi et al., 1999; Krueger et al., 2001; Golks et al., 2005, 2006). All three isoforms possess two DED domains.

US 2011-0172234 describes small molecule-based drugs that can be used to bind to DRs TRAIL-R1/DR4 and/or TRAIL-R2/DR5 and induce apoptosis in cancer cells, while sparing normal cells. Also described are TRAIL Death Receptor Agonists/Activators (DRAs) and their uses, such as the induction of apoptosis through caspase-8 and caspase-3 activation. US 2011-0172234 also relates to methods of treating cancers, such as breast, prostate, colon, pancreatic, ovarian, lung, and brain cancers, leukemia, lymphoma, multiple myeloma, and mesothelioma, using DRAs either as single-agent treatments, or in combination with other therapies.

US 2017-0108504 discloses methods for treating colorectal cancer by administering to a colorectal cancer patient a chemotherapeutic agent that is capable of activating caspase-8, wherein the patient contains a cancer cell that expresses a Bax.DELTA.2 protein.

US 2008-0171051 relates to methods and compositions for treatment of cancer. In one embodiment the method involves the use of a c-FLIP inhibitor as the sole active agent. In another embodiment the invention relates to the treatment of p53 mutant cancers using combinations of c-FLIP inhibitors and chemotherapeutic agents.

Bucur et al. (in: A novel caspase 8 selective small molecule potentiates TRAIL-induced cell death. Sci Rep. 2015 May 11; 5:9893. doi: 10.1038/srep09893) disclose that recombinant soluble TRAIL and agonistic antibodies against TRAIL receptors (TRAIL-R1/DR4 and TRAIL-R2/DR5) are developed for clinical cancer therapy, due to their selective killing of cancer cells and high safety characteristics. However, resistance to TRAIL and other targeted therapies is an important issue facing current cancer research field. An attractive strategy to sensitize resistant malignancies to TRAIL-induced cell death is the design of small molecules that target and promote caspase-8 activation. They describe the discovery and characterization of a small molecule that directly binds caspase-8 and enhances its activation when combined with TRAIL, but not alone. The molecule was identified through an in silico chemical screen for compounds with affinity for the caspase-8 homodimer's interface. The compound was experimentally validated to directly bind caspase-8, and to promote caspase-8 activation and cell death in single living cells or population of cells, upon TRAIL stimulation. They propose a proof-of-concept strategy leading to the discovery of a novel small molecule that not only stimulates TRAIL-induced apoptosis in cancer cells, but may also provide insights into the structure-function relationship of caspase-8 homodimers as putative targets in cancer.

Current approaches for the development of apoptosis inducing agonists as anticancer agents include the use of monoclonal antibodies, as discussed in WO 2002/079377 as well as, for example, the use of a soluble form of TRAIL. Given the drawback of monoclonal antibodies and polypeptide therapeutics, new strategies for treating cancer by targeting DR pathway are desirable. Other objects and aspects of the present invention will become apparent to the person of skill upon reading the following description of the invention.

According to a first aspect thereof, the above object of the invention is solved by a method for identifying a compound that modulates the interaction of caspase-8 with c-FLIP in a cell, comprising the steps of a1) contacting at least one of caspase-8, a c-FLIP binding fragment of caspase-8, a cell expressing caspase-8, and/or a cell expressing a c-FLIP binding fragment thereof with at least one compound that potentially modulates the interaction of caspase-8 with c-FLIP in a cell, or a2) contacting at least one of c-FLIP, a caspase-8 binding fragment of c-FLIP, a cell expressing c-FLIP, and/or a cell expressing a caspase-8 binding fragment thereof with at least one compound that potentially modulates the interaction of c-FLIP with caspase-8 in a cell, or a3) contacting at least one of a complex of caspase-8 with c-FLIP, a complex of at least one binding fragment of caspase-8 or c-FLIP with c-FLIP or caspase-8, respectively, and/or a cell expressing at least one of a complex of caspase-8 with c-FLIP, a complex of at least one binding fragment of caspase-8 or c-FLIP, with c-FLIP or caspase-8, respectively, with at least one compound that potentially modulates the interaction of said fragment(s) in a cell, and b) identifying a modulation of the binding of c-FLIP or said fragment to caspase-8 or the binding of caspase-8 or said fragment to c-FLIP in the presence of said at least one compound, wherein said modulation is selected from an increase of said binding, a stabilization of said binding, and an increase of Caspase-8 activity in said cell, in particular Caspase-8 activity in the heterodimer Caspase-8/c-FLIP$_L$.

Preferred is a method according to the present invention, wherein said compound is selected from small molecular drugs.

Further preferred is a method according to the present invention, further comprising the step(s) of testing said compound as identified for its activity to sensitize tumour cells to apoptosis.

Even further preferred is a method according to the present invention that further comprises a computational analysis of and optimization based on the structure, in particular the three-dimensional and/or crystal structure of the heterodimer Caspase-8/c-FLIP.

According to a second aspect thereof, the above object of the invention is solved by a compound is selected from a compound according to the following formula I:

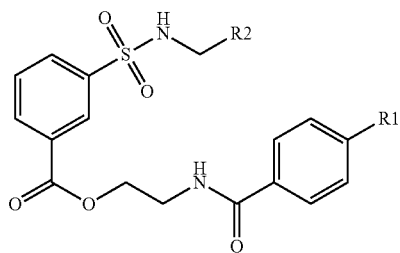

wherein R1 and R2 are independently selected from aryl, substituted aryl, alkyl, substituted alkyl, halo alkyl, alkoxy, heteroaryl, subtituted heteroaryl, alkylthio, alkoxycarbonyl, —SO$_2$NH$_2$, —SO$_2$NH-alkyl, —SO$_2$NH-aryl, —SO$_2$NH-substituted aryl, 2-nitroethyl, nitromethyl, and a pharmaceutically acceptable salt thereof.

According to a third aspect thereof, the above object of the invention is solved by a pharmaceutical composition for treating or preventing cancer, obtained by a method according to the present invention or comprising a compound according to the present invention, together with a pharmaceutically acceptable carrier.

According to a fourth aspect thereof, the above object of the invention is solved by the compound according to the present invention or the pharmaceutical composition for use in the prevention or treatment of diseases, such as for treating or preventing cancer.

This aspect also involves a method of treating cancer in an individual comprising administering to the individual a therapeutically effective amount of the compound according to the present invention or of the pharmaceutical composition according to the present invention.

Preferably, said cancer is selected from brain, lung, liver, spleen, kidney, lymph node, small intestine, pancreas, blood cell, bone, colon, stomach, breast, endometrium, prostate, testicle, ovary, central nervous system, skin, head and neck, esophagus, or bone marrow cancer.

According to a fifth aspect thereof, the above object of the invention is solved by the use of the compound according to the present invention or the pharmaceutical composition according to the present invention for inducing apoptosis in a cell, in particular for use in inducing apoptosis in a cancer cell.

According to a sixth aspect thereof, the above object of the invention is solved by a screening tool for screening for a compound that modulates the interaction of caspase-8 with c-FLIP, comprising an isolated cell expressing caspase-8 and/or a c-FLIP binding fragment thereof or a cell expressing c-FLIP and/or a caspase-8 binding fragment thereof or at least one of a complex of caspase-8 with c-FLIP, a complex of at least one binding fragment of caspase-8 or c-FLIP, with c-FLIP or caspase-8, respectively.

In the context of the present invention, the inventors designed a screening system by using advanced methods of in silico computational biology, in order to design a representative "small molecule" targeting the heterodimer caspase-8/c-FLIP$_L$, which plays a key role in apoptosis regulation.

The inventive design strategy is to mimic the stabilizing effect on the L2' loop in a 'closed' conformation, which should in turn lead to the increase of caspase-8 activity at the DISC, and thus a more efficient apoptosis induction. The latter is based on the hypothesis that the switch of the L2' loop from a 'closed' to an 'open' conformation, as induced by L2 loop processing, leads to the destabilization of the p43/p10/c-FLIP$_L$ complex.

The experimental data that were obtained with the small molecule FLIPinBγ according to the present invention support this predicted mechanism. Indeed, the compound was most efficient in cells overexpressing c-FLIP$_L$, HeLa-CD$_{95}$-FL cells. Furthermore, co-treatment with FLIPinBγ and DL caused enhanced apoptotic cell death, caspase activation and caspase-8 activity at the DISC providing additional evidence for the mechanism as suggested.

Thus, a method for identifying a compound that modulates the interaction of caspase-8 with c-FLIP in a cell was designed. The method comprises steps of:

1. Contacting at least one of caspase-8, a c-FLIP binding fragment of caspase-8, a cell expressing caspase-8, and/or a cell expressing a c-FLIP binding fragment thereof with at least one compound that potentially modulates the interaction of caspase-8 with c-FLIP in a cell. This part of the assay generally screens for compounds that interact with caspase-8 or a c-FLIP binding fragment of caspase-8.

2. Contacting at least one of c-FLIP, a caspase-8 binding fragment of c-FLIP, a cell expressing c-FLIP, and/or a cell expressing a caspase-8 binding fragment thereof with at least one compound that potentially modulates the interaction of c-FLIP with caspase-8 in a cell. This part of the assay generally screens for compounds that interact with c-FLIP or a caspase-8 binding fragment of c-FLIP.

3. Contacting at least one of a complex of caspase-8 with c-FLIP, a complex of at least one binding fragment of caspase-8 or c-FLIP with c-FLIP or caspase-8, respectively, and/or a cell expressing at least one of a complex of caspase-8 with c-FLIP, a complex of at least one binding fragment of caspase-8 or c-FLIP, with c-FLIP or caspase-8, respectively, with at least one compound that potentially modulates the interaction of said fragment(s) in a cell. This part of the assay generally screens for compounds that interact with the complex of caspase-8/c-FLIP.

In the next step, the method then involves an identifying of a modulation of the binding of c-FLIP or said fragment to caspase-8 or the binding of caspase-8 or said fragment to c-FLIP in the presence of said at least one compound. The modulation is selected from a) an increase of said binding, and/or b) a stabilization of said binding, and c) an increase of caspase-8 activity in said cell as disclosed herein, in particular Caspase-8 activity in the heterodimer Caspase-8/c-FLIP$_L$.

Preferred is a screening assay that screens for compounds that are specific for caspase-8, and induce and/or increase/enhance the activity thereof in the heterodimer caspase-8/c-FLIP.

It was surprisingly found by the present inventors that the heterodimer Caspase-8/c-FLIP$_L$ or the components thereof, i.e. caspase-8 and/or c-FLIP provide valuable tools for therapeutic approaches in order to treat or prevent cancer. The inventors found it conceivable to target said components in human disease without affecting vital functions.

In the context of the present invention, the term "caspase-8" shall be understood as also indicating/representing the mammalian (in particular mouse) homolog of the human caspase-8 gene and/or protein and/or mRNA. Also, the term shall comprise the complete caspase-8 polypeptide or fragment(s) as described herein, such as the c-FLIP-binding fragment. The term also covers caspase-8 in different preparations, such as in the cellular context, purified from the cell, or as part or associated with stress granules, and fractions thereof. Finally, the term also includes the procaspase-8 form, i.e. its precursor.

Similarly, "c-FLIP" shall be understood as also indicating/representing the mammalian (in particular mouse) homolog of the human c-FLIP gene and/or protein and/or mRNA. Also, the term shall comprise the complete c-FLIP polypeptide or fragment(s) as described herein, such as the caspase-8-binding fragment. The term explicitly includes the three c-FLIP isoforms, Long (L), Short (S), and Raji (R), i.e., c-FLIP$_L$, c-FLIP$_S$, and c-FLIP$_R$ and the two cleavage products, as long as the isoform possesses at least one, preferably two DED domains. Preferred is c-FLIP$_L$. The term also covers c-FLIP in different preparations, such as in the cellular context, purified from the cell, or as part or associated with stress granules, and fractions thereof.

The term "contacting" in the present invention means any interaction between the potentially binding substance(s) with caspase-8 and/or c-FLIP, whereby any of the components can be independently of each other in a liquid phase, for example in solution, or in suspension or can be bound to a solid phase, for example, in the form of an essentially planar surface or in the form of particles, pearls or the like. In a preferred embodiment a multitude of different potentially binding substances are immobilized on a solid surface like, for example, on a compound library chip and caspase-8 and/or c-FLIP (or a functional part thereof) or the heterodimeric complex thereof are subsequently contacted with such a chip.

Preferably, said identifying comprises a method selected from immunoprecipitation, flow cytometry, fluorescence microscopy, and other assays to measure apoptosis/the induction of apoptosis in said cell(s). Respective assays are also known to the person of skill, and disclosed below.

More preferred is a method according to the present invention, wherein said compound is selected from the group consisting of a peptide library, a combinatory library, a cell extract, a "small molecular drug", an antisense oligonucleotide, an siRNA, and an antibody or fragment thereof specifically interfering/stabilizing with the binding of c-FLIP to caspase-8 and/or caspase-8 to c-FLIP.

In the context of the present invention, a "small molecular drug" or "small molecule" is one that has a molecular weight of below 2000 Da, preferably of below 1000 Da, optimally in the range of between 600 and 200 Da.

In a preferred example of the method according to the present invention, said compound is a small molecule and is selected from a compound according to the following formula I:

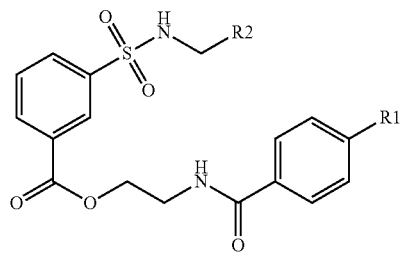

wherein R1 and R2 are independently selected from aryl, substituted aryl, alkyl, substituted alkyl, halo alkyl, alkoxy, heteroaryl, substituted heteroaryl, alkylthio, alkoxycarbonyl, —SO$_2$NH$_2$, —SO$_2$NH-alkyl, —SO$_2$NH-aryl, —SO$_2$NH-substituted aryl, 2-nitroethyl, nitromethyl, and a pharmaceutically acceptable salt thereof.

According to the invention, said cell can be selected from the group of cancer cells; human non-embryonic stem cells: recombinant host cells expressing c-FLIP and/or c-FLIP or caspase-8 or the binding fragment(s) thereof, wherein said recombinant host cells optionally express c-FLIP and/or caspase-8 or the binding fragment(s) thereof; yeast cells; and recombinant bacterial cells.

Preferred is a method according to the present invention, wherein said caspase-8 binding fragment of c-FLIP comprises the L2 loop amino acids, and/or wherein said c-FLIP binding fragment of caspase-8 comprises the amino acid residues of the β6/α$_3$ groove. The c-FLIP and/or caspase-8 or the binding fragment(s) thereof employed in a method of the present invention can be a full length protein or a fragment with N/C-terminal and/or internal deletions. Preferably the fragment is one that comprises the binding part of caspase-8 to c-FLIP as described herein.

Another aspect is directed at a method according to the present invention, further comprising testing said compound(s) as identified for its activity to sensitise tumour cells to apoptosis. Since apoptosis occurs via a complex signaling cascade that is tightly regulated at multiple points, there are many opportunities to evaluate the activity of the proteins involved. A large number of apoptosis assays are devised to detect and count apoptotic cells. Apoptosis assays, based on methodology, can be classified into six major groups and include assays detecting cytomorphological alterations; DNA fragmentation; detection of caspases, cleaved substrates, regulators and inhibitors; membrane alterations; detection of apoptosis in whole mounts; and mitochondrial assays. One preferred assay is the microculture-kinetic (MiCK) assay. Respective assays are known to the person of skill, and can be taken from the respective literature.

Preferred is a method according to the present invention, wherein said caspase-8 and/or c-FLIP and/or the fragments thereof are suitably labeled. Measuring of binding of the compound to caspase-8 and/or c-FLIP and/or the fragments thereof can be carried out either by measuring a marker that can be attached either to the protein or to the potentially interacting compound. Suitable markers are known to someone of skill in the art and comprise, for example, fluorescence or radioactive markers. The binding of the two components can, however, also be measured by the change of an electrochemical parameter of the binding compound or of the protein, e.g. a change of the redox properties of caspase-8 and/or c-FLIP and/or the fragments thereof or the binding compound, upon binding. Suitable methods of detecting such changes comprise, for example, potentiometric methods. Further methods for detecting and/or measuring the binding of the two components to each other are known in the art and can without limitation also be used to measure the binding of the potential interacting compound to caspase-8 and/or c-FLIP and/or the fragments thereof. The effect of the binding of the compound or the activity of caspase-8 and/or c-FLIP and/or the fragments thereof can also be measured indirectly, for example, by assaying an enzymatic activity of caspase-8 and/or c-FLIP and/or the fragments thereof after binding.

As a further step the method according to the present invention said method can furthermore comprise a computational optimization based on said structure of the heterodimer Caspase-8/c-FLIP$_L$. Respective methods are disclosed herein and below.

As a further step after measuring the binding of a potentially interacting compound and after having measured at least two different potentially interacting compounds at least one compound can be selected, for example, on grounds of the measured binding activity or on grounds of the detected increase of caspase-8 and/or c-FLIP (binding) activity and/or expression.

The thus selected binding compound can then in a preferred embodiment modified in a further step. Modification can be effected by a variety of methods known in the art, which include without limitation the introduction of novel side chains or the exchange of functional groups like, for example, introduction of halogens, in particular F, Cl or Br, the introduction of lower alkyl groups, preferably having one to five carbon atoms like, for example, methyl, ethyl, n-propyl, isopropyl, n-butyl, isobutyl, tert-butyl, n-pentyl or iso-pentyl groups, lower alkenyl groups, preferably having two to five carbon atoms, lower alkynyl groups, preferably having two to five carbon atoms or through the introduction of, for example, a group selected from the group consisting of $NH_2$, $NO_2$, OH, SH, NH, CN, aryl, heteroaryl, COH or COOH group.

The thus modified binding substances are than individually tested with a method of the present invention, i.e. they are contacted with caspase-8 and/or c-FLIP and/or the fragments thereof and subsequently binding of the modified compounds to the caspase-8 and/or c-FLIP and/or the fragments thereof is measured. In this step, both the binding per se can be measured and/or the effect of the function of the caspase-8 and/or c-FLIP and/or the fragments thereof like, e.g. the binding to caspase-8 and/or c-FLIP and/or the fragments thereof and/or the enzymatic activity of the polypeptide(s) can be measured. If needed the steps of selecting the binding compound, modifying the binding compound, contacting the binding compound with caspase-8 and/or c-FLIP and/or the fragments thereof and measuring the binding of the modified compounds to the protein(s) can be repeated a third or any given number of times as required. The above described method is also termed "directed evolution" since it involves a multitude of steps including modification and selection, whereby binding compounds are selected in an "evolutionary" process optimizing its capabilities with respect to a particular property, e.g. its binding activity, its ability to activate or modulate the activity of the polypeptide(s) of caspase-8 and/or c-FLIP and/or the fragments thereof.

Another aspect of the present invention relates to a method for manufacturing a pharmaceutical composition for treating or preventing cancer, comprising the steps of performing the method according to the present invention, and formulating said compound as identified into a pharmaceutical composition.

In a further embodiment of the method of the present invention, the interacting compound identified as outlined above, which may or may not have gone through additional rounds of modification and selection, is admixed with suitable auxiliary substances and/or additives. Such substances comprise pharmacological acceptable substances, which increase the stability, solubility, biocompatibility, or biological half-life of the interacting compound or comprise substances or materials, which have to be included for certain routs of application like, for example, intravenous solution, sprays, band-aids or pills.

Carriers, excipients and strategies to formulate a pharmaceutical composition, for example to be administered systemically or topically, by any conventional route, in particular enterally, e.g. orally, e.g. in the form of tablets or capsules, parenterally, e.g. in the form of injectable solutions or suspensions, topically, e.g. in the form of lotions, gels, ointments or creams, or in nasal or a suppository form are well known to the person of skill and described in the respective literature.

A preferred binding compound according to the present invention is selected from a compound according to the following formula I:

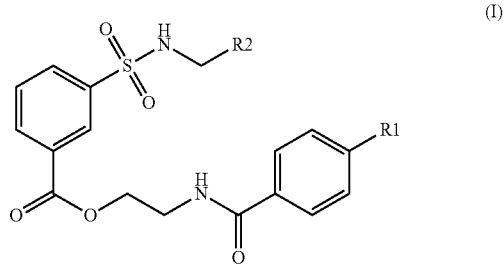

(I)

wherein R1 and R2 are independently selected from aryl, substituted aryl, alkyl, substituted alkyl, halo alkyl, alkoxy, heteroaryl, subtituted heteroaryl, alkylthio, alkoxycarbonyl, —$SO_2NH_2$, —$SO_2$NH-alkyl, —$SO_2$NH-aryl, —$SO_2$NH-substituted aryl, 2-nitroethyl, nitromethyl, and a pharmaceutically acceptable salt thereof.

A preferred compound according to the present invention is 2-[(4-phenylbenozyl)amino]ethyl 3-(benzylsulfamoyl)benzoate (FLIPinB) according to formula II

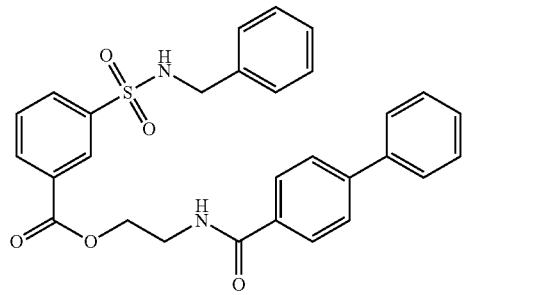

(II)

or a pharmaceutically acceptable salt thereof.

A preferred compound according to the present invention is 2-[[4-(4-pyridyl)benzoyl]amino]ethyl 3-(3-pyridylmethylsulfamoyl)benzoate (FLIPinBgamma) according to formula III (III)

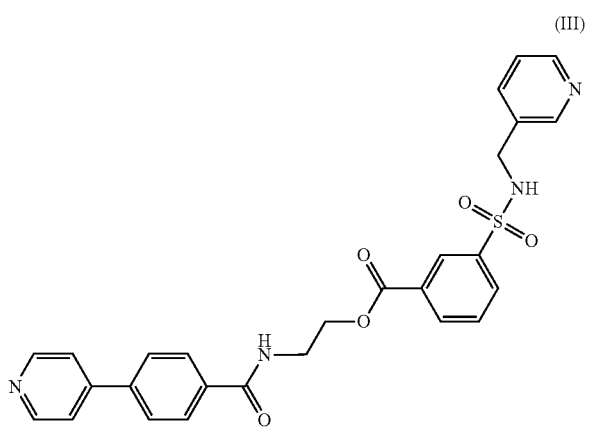 [SMILES: O=C(NCCOC(=O)c1cccc(S(=O)(=O)NCc2cccnc2)c1)c1ccc(-c2ccncc2)cc1]

or a pharmaceutically acceptable salt thereof.

Another aspect of the present invention relates to a pharmaceutical composition for treating or preventing cancer, obtained by a method according to the present invention, or comprising a compound according to the present invention, together with a pharmaceutically acceptable carrier.

Administration of an agent, e.g., a compound, optionally in the form of a pharmaceutical compisition, can be accomplished by any method which allows the agent to reach the target cells. These methods include, e.g., injection, deposition, implantation, suppositories, oral ingestion, inhalation, topical administration, or any other method of administration where access to the target cells by the agent is obtained. Injections can be, e.g., intravenous, intradermal, subcutaneous, intramuscular or intraperitoneal. Implantation includes inserting implantable drug delivery systems, e.g., microspheres, hydrogels, polymeric reservoirs, cholesterol matrices, polymeric systems, e.g., matrix erosion and/or diffusion systems and non-polymeric systems, e.g., compressed, fused or partially fused pellets. Suppositories include glycerin suppositories. Oral ingestion doses can be enterically coated. Inhalation includes administering the agent with an aerosol in an inhalator, either alone or attached to a carrier that can be absorbed. The agent can be suspended in liquid, e.g., in dissolved or colloidal form. The liquid can be a solvent, partial solvent or non-solvent. In many cases, water or an organic liquid can be used.

Another aspect of the present invention relates to the compound according to the present invention or the pharmaceutical composition according to the present invention for use in the prevention or treatment of diseases. Yet another aspect of the present invention relates to the compound according to any one of the present invention or the pharmaceutical composition according to the present invention for use in inducing apoptosis in a cell, in particular a cancer cell. Yet another aspect of the present invention relates to the compound according to any one of the present invention or the pharmaceutical composition according to the present invention for use in the prevention or treatment of cancer in a patient.

Preferably, said cancer is selected from brain, lung, liver, spleen, kidney, lymph node, small intestine, pancreas, blood cell, bone, colon, stomach, breast, endometrium, prostate, testicle, ovary, central nervous system, skin, head and neck, esophagus, or bone marrow cancer.

According to another aspect thereof, the object of the present invention is solved by providing a screening tool for an agent for treating or preventing cancer, in particular a screening tool for screening for a compound that modulates the interaction of caspase-8 with c-FLIP, comprising an isolated cell expressing caspase-8 and/or a c-FLIP binding fragment thereof or a cell expressing c-FLIP and/or a caspase-8 binding fragment thereof or at least one of a complex of caspase-8 with c-FLIP, a complex of at least one binding fragment of caspase-8 or c-FLIP, with c-FLIP or caspase-8, respectively.

The cell can be a prokaryotic or eukaryotic cell, and the expression constructs can be present extrachromosomally or integrated into the chromosome. The polypeptides can be expressed in the form of a fusion protein, for example together with an enzymatically active moiety as reporter-construct, in order to be able to detect the expression product. Preferred host cells are derived from cells selected from the skeletal muscle, liver, adipose tissue, heart, pancreas, kidney, breast tissue, ovarian tissue, and/or hypothalamus. Thus, preferred is a screening tool according to the present invention, wherein said cell is selected from cancer cells; recombinant host cells expressing said c-FLIP and/or caspase-8 and/or binding fragments thereof; yeast cells; and recombinant bacterial cells.

Preferred is a screening tool according to the present invention, wherein said wherein said caspase-8 and/or c-FLIP and/or the fragments thereof are suitably labeled, as also described above.

Further preferred is a screening tool according to the present invention, wherein said caspase-8 binding fragment of c-FLIP comprises the L2 loop amino acids, and/or wherein said c-FLIP binding fragment of caspase-8 comprises the amino acid residues of the β6/α3 groove.

According to yet another aspect thereof, the object of the present invention is solved by providing a screening tool for an agent for treating or preventing cancer, in particular a screening tool for screening for a compound that modulates the expression, the biological activity and/or the interaction of caspase-8 and/or c-FLIP and/or the fragments thereof in a cell, wherein said cell as above is part of a non-human transgenic mammal, which preferably overexpresses caspase-8 and/or c-FLIP and/or the fragments thereof, optionally as a genetic reporter-construct. Preferred is a transgenic mouse, rat, pig, goat or sheep, wherein the reporter-construct is preferably expressed in cells selected from the skeletal muscle, liver, adipose tissue, heart, pancreas, kidney, and/or hypothalamus of said animal. Methods to produce these non-human transgenic mammal overexpressing caspase-8 and/or c-FLIP and/or the fragments thereof and/or carrying a caspase-8 and/or c-FLIP and/or the fragments thereof genetic reporter-construct are well known to the person of skill in the art. Preferred are also transgenic non-human mammals wherein the gene that is homologous to caspase-8 and/or c-FLIP and/or the fragments thereof is exchanged by genes having a modified function (e.g. knock-out or knock-in animal).

Similar to the strategies for identifying compounds that interact with caspase-8 and/or c-FLIP and/or the fragments thereof, compounds can be identified that modulate the expression of caspase-8 and/or c-FLIP in a cell. In preferred strategies, the expression of caspase-8 and/or c-FLIP can be monitored using a genetic reporter-construct for caspase-8 and/or c-FLIP (in order to analyse the translation efficiency and/or stability of the caspase-8 and/or c-FLIP polypeptide), for an example a fusion protein comprising a detectable fusion member (such as an enzymatic or fluorophoric group, or GFP), or the amount of mRNA as present in a cell can be measured, for example, by Northern blot. The expression can also be analysed and monitored by using chip-analysis or rtPCR. Preferred compounds that modulate the expression of caspase-8 and/or c-FLIP in a cell are selected from specific antisense oligonucleotides, siRNAs or other preferably mutated nucleic acids encoding caspase-8 and/or c-FLIP, or the binding fragments thereof. These genetic elements can be used in order to provide/maintain the loss-of-function (e.g. by the truncations as identified) of caspase-8 and/or c-FLIP, or the binding fragments thereof, in said cell. Another preferred embodiment is the transfer of said genetic elements using gene therapy. Furthermore, encompassed are viral constructs for the introduction of said genetic elements into said cells. Alternatively, also the "naked" nucleic acid can be introduced into the cell(s), e.g. by using particle-mediated technologies. Respective methods are well described in the literature and known to the person of skill.

According to yet another aspect thereof, the present invention relates to the use of the tools according to the present invention as described herein for screening for a compound that modulates the expression, the biological activity and/or the interaction of caspase-8 and/or c-FLIP in a cell as described herein.

Another aspect of the present invention then relates to a method for treating or preventing cancer in a patient, comprising administering to said patient a therapeutically effective amount of the compound or the pharmaceutical composition according to the invention as above. In general, the attending physician will base a treatment on the compound as identified, and optionally also on other individual patient data (clinical data, family history, DNA, etc.), and a treatment can also be performed based on the combination of these factors. This method of the present invention for example involves integrating individual diagnostic cancer data with patient clinical information and general healthcare statistics to enable, for example, the application of personalized medicine to the patient. Significant information about drug effectiveness, drug interactions, and other patient status conditions can be used, too.

Preferred is a therapeutic method according to the present invention, wherein said mammal to be treated is a mouse, rat or human. More preferably, the cancer to be treated is, for example, selected from breast, bone, ovarian, blood (e.g. leukemias), kidney, and lung cancer.

Preferably, an active agent is administered in form of a pharmaceutical composition, such as an antibody, nucleotide or an activating binding compound for the caspase-8/c-FLIP binding. Preferably, said patient is a human being. Treating is meant to include, e.g., preventing, treating, reducing the symptoms of, or curing the disease or condition, i.e. cancer.

The c-FLIP or caspase-8 or complex binding compound according to the invention, an optional chemotherapeutic agent and where applicable the DL may be administered simultaneously, sequentially or simultaneously. In preferred embodiments of the invention, the c-FLIP or caspase-8 or complex binding compound is administered prior to the chemotherapeutic agent.

Preferred is a method according to the present invention, wherein said cancer to be treated is selected from brain, lung, liver, spleen, kidney, lymph node, small intestine, pancreas, blood cell, bone, colon, stomach, breast, endometrium, prostate, testicle, ovary, central nervous system, skin, head and neck, esophagus, and bone marrow cancer.

DED chain/filaments assembly is crucial for procaspase-8a/b dimerization and subsequent activation. In the course of dimerization, procaspase-8 undergoes a conformational change which triggers the rearrangement of the L2 loop in the zymogen structure. The L2 loop contains the active cysteine and, accordingly, its rearrangement in the course of dimerization naturally forms the active center of procaspase-8a/b. This is followed by the cleavage of the L2 loop at Asp374 into the L2 ('processed' L2 fragment) and L2' parts followed by their subsequent structural rearrangement. The cleavage of the L2 loop at Asp374 leads to the generation of p43/p41 (denoted thereafter as p43) and p12 cleavage products, which are further auto-catalytically processed via proteolysis at Asp384 and Asp210/216 resulting in the formation of the active caspase-8 heterotetramer $p10_2/p18_2$ (Hughes et al., 2009).

c-$FLIP_L$ also contains catalytically inactive caspase-like domains (p20 and p12). The short c-FLIP isoforms, c-$FLIP_S$ and c-$FLIP_R$, block DR-induced apoptosis by inhibiting procaspase-8 activation at the DISC, presumably by forming catalytically inactive heterodimers (Schleich et al., 2016). In addition, recently, it was reported that short c-FLIP isoforms block caspase-8 activation by interrupting the chains of procaspase-8 at the DISC (Hughes et al., 2016). c-$FLIP_L$ at the DISC can act both in a pro- as well as in an anti-apoptotic manner.

The pro-apoptotic function of c-$FLIP_L$ has been suggested to be mediated by the formation of procaspase-8/c-$FLIP_L$ heterodimers in which the L2 loop of procaspase-8 is stabilized in the active conformation through interactions with c-$FLIP_L$ (Micheau et al., 2002; Yu, Jeffrey and Shi, 2009), which enhances the catalytic activity of the caspase-8 enzyme. In particular, a unique feature observed in the procaspase-8/c-$FLIP_L$ heterodimer is a so-called 'closed' conformation of the unprocessed L2' fragment (denoted thereafter L2' loop), which apparently stabilizes the active center of caspase-8 and thereby promotes a catalytic activity of the heterodimer (Yu, Jeffrey and Shi, 2009). The cleavage of the L2 loop of procaspase-8 at Asp374 was suggested to lead to the translocation of the L2' loop from the heterodimer interface, which accordingly results in a change from a 'closed' to an 'open' conformation. This might lead to destabilization of the active center and subsequently a diminished activity of caspase-8.

In order to validate this hypothesis, the inventors took advantage of the state-of-the art methods of in silico biology and constructed a compound-based chemical tool that was designed to mimic the stabilizing effect of the L2' loop in a 'closed' conformation. In particular, the inventors rationally designed a small molecule that binds to c-$FLIP_L$ at the interface of the heterodimer caspase-8/c-$FLIP_L$, aiming at stabilization of the active center of caspase-8 in the caspase-8/c-$FLIP_L$ heterodimer after processing at Asp374. The optimized chemical compound enhanced caspase-8 activity at the DISC and promoted cell death.

Thus, the inventors' findings provide new insights into the molecular mechanism of the function of the procaspase-8/c-$FLIP_L$ heterodimer and propose the undescribed allosteric site of caspase-8 activation within this heterodimer. Moreover, generated computational model of the DISC further supported the suggested mechanism. Taken together, the inventors' study uncovers the potential of targeting the caspase-8/c-$FLIP_L$ heterodimer via structure-based design leading to the development of compounds which can serve as drugs promoting apoptosis in cancer cells.

In this invention the inventors used advanced methods of in silico computational biology to design a compond (here: small molecule) targeting the heterodimer caspase-8/c-$FLIP_L$, which plays a key role in apoptosis regulation. The design strategy of the small molecule was to mimic the stabilizing effect on the L2' loop in a 'closed' conformation, which should in turn lead to the increase of caspase-8 activity at the DISC and more efficient apoptosis induction. The latter is based on the hypothesis that the switch of the L2' loop from a 'closed' to an 'open' conformation, as induced by L2 loop processing, might lead to the destabilization of the p43/p10/c-FLIP$_L$ complex. The experimental data that were obtained with the small molecule FLIPinBγ, support the predicted in silico mechanism. Indeed, this compound was most efficient in cells overexpressing c-FLIP$_L$, HeLa-CD95-FL cells. Furthermore, co-treatment with FLIPinBγ and DL caused enhanced apoptotic cell death, caspase activation and caspase-8 activity at the DISC providing evidence for the mechanism suggested for FLIPinBγ action in silica.

The suggested mechanism of FLIPinBγ function provides a challenging possibility to the hypothesis of apoptosis priming via the heterodimer caspase-8/c-FLIP$_L$. According to a number of studies c-FLIP$_L$ has a higher affinity to FADD than caspase-8 (Bentele et al., 2004), while according to the others caspase-8 binds to FADD first giving a rise to procaspase-8/c-FLIP$_L$ heterodimer (Hughes et al., 2016). In both scenarios procaspase-8/c-FLIP$_L$ heterodimer is an initial block in the DED chain/filament inducing the subsequent DED chain assembly. Initital activation of caspase-8 in the heterodimer leads to the activation of adjacent caspase-8 molecules in the DED chain that, in turn, triggers apoptosis. However, caspase-8 activity in the heterodimer subsequently leads to c-FLIP$_L$ processing and subsequent changing the conformation of the L2 loop. This terminates the 'priming activity' of the heterodimer in the chain that is reversed in the inventors' study by FLIPinBγ. Hence, the 'priming activity' of the heterodimer might play a role only at the very initial stages of the DED chain assembly.

The suggested molecular mechanism of FLIPinBγ action may involve allosteric regulation, which has been also reported for other caspases, as well as a stabilizing role for heterodimer complex formation. Caspases are known to have an allosteric site in the inter-subunit homodimerization interface (Hardy et al., 2004; Scheer, Romanowski and Wells, 2006). In particular, such allosteric sites of caspase-1, caspase-5 and caspase-8 have been recently targeted by small molecules. Allosteric inhibitors of caspase-5 and caspase-1 were shown to stabilize enzymes at the zymogen conformation resulting in high activity (Hardy et al., 2004; Scheer, Romanowski and Wells, 2006). A small molecule targeting the caspase-8 homodimer was shown to enhance TRAIL-induced apoptosis but at a high compound concentration (Bucur et al., 2015). Therefore, the inventors targeted the heterodimerization interface of the caspase-8/c-FLIP$_L$ complex, which could also be a promising strategy for further design of CD95L and TRAIL potentiating compounds.

Cellular signal transmission which regulates apoptosis represents an ideal system to go into quantitative studies using methods of the emerging field of systems biology (Lavrik, 2014). The computational modeling of the apoptosis pathway dynamics is very advanced, and detailed experimentally validated models focusing on multiple aspects are available. In this study the inventors have generated a link between in silico methods to modeling the apoptotic signaling pathways and cancer therapy by extending the model of the DISC and apoptosis signaling with the effect of a specific small molecule FLIPinBγ that increases the activity of caspase-8/c-FLIP$_L$ heterodimer and thereby promoting apoptosis. Importantly, the generated model can describe the biochemical reaction kinetics of FLIPinBγ action at the DISC, predict an increase in heterodimer concentration leading to the increase of caspase-8 activity and, most importantly, precisely predict the response of cancer cell population to the addition of FLIPinBγ. This is a very important step for therapies that might use the possibilities of modeling the interactions of drugs with cell death pathways. Interestingly, for growth factor related pathways, the model based drug design has already made the step to clinical studies (Schoeberl et al., 2017).

The moderate pro-apoptotic activity of the designed compound FLIPinBγ might be explained by several factors. One of the key assumptions for the rational design of caspase-8 activating small molecules was the preservation of the c-FLIP$_L$ conformation in a similar fashion as was observed in the procaspase-8/c-FLIP$_L$ complex. The inventors expect that moderate conformational changes of the c-FLIP$_L$ are still possible reducing accuracy for rational design of small molecules. The short half-life of the caspase-8/c-FLIP$_L$ complex could be another stumbling stone in designing such compounds. Finally, the moderate activity of FLIPinBγ might be due to the low abundance of c-FLIP$_L$ in the DED chains. Indeed, a quantitative proteomics analysis of DED chains demonstrated that c-FLIP is present in a ten times lower concentration in the filaments as compared to procaspase-8. Therefore, there is only a limited number of procaspase-8/c-FLIP$_L$ heterodimers present in each chain limiting the effects of FLIPinBγ (Schleich et al., 2012, 2016). Furthermore, according to prediction of the kinetic model FLIPinBγ activity can be enhanced up to several times upon increase of c-FLIP$_L$/procaspase-8 ratio. In this regard, consideration that a number of cancer cells have a high level of c-FLIP$_L$, allows to suggest that the development of compounds based on FLIPinBγ in general has an extremely high therapeutic potential.

In contrast to the major regulators of the intrinsic apoptosis pathway, to which specific small molecule based inhibitors have already been successfully developed and are currently in clinical trials, the extrinsic pathway is only starting to be addressed (Roberts et al., 2016). This is due to the fact that the 3D structures of the major initiatory proteins of the pathway have been solved only recently (Fu et al., 2016). This in particular, concerns the major proteins of the DISC complex and the 3D structure of the CD95 DISC complex itself. Solving of the latter structure would undoubtedly open new possibilities for drug discovery and the development of novel, more effective and selective anti-cancer therapies. Taken together, this work provides a basis for the development of new therapies against cancer via specific enhancement of the activity of the key enzyme of the extrinsic apoptosis-caspase-8 and paving the new avenues for specifically targeting DR-induced apoptosis.

Pharmacological targeting via small molecule-based chemical probes has recently acquired an emerging importance as a valuable tool to delineate molecular mechanisms. Caspase-8 activation in DR-mediated apoptosis is controlled by cellular FLICE inhibitory proteins (c-FLIPs).

However molecular mechanisms of this regulation have just started to be uncovered. Therefore, the present invention relates to first in class chemical probes that increase caspase-8 activity in the heterodimer caspase-8/c-FLIP$_L$. The rationally designed small molecule, targeting c-FLIP$_L$ in the heterodimer caspase-8/c-FLIP$_L$, enhanced caspase-8 activity in the death-inducing signaling complex (DISC), CD95L/TRAIL-induced caspase activation and subsequent apoptosis.

The computational model of the DISC as generated provided further evidence for the proposed molecular mechanism of targeting the heterodimer caspase-8/c-FLIP$_L$.

Taken together, the present invention opens new horizons for the development of anti-cancer therapeutic strategies.

The present invention will now be further described in the examples with reference to the accompanying figures, nevertheless, without wanting to be limited thereto. For the purposes of the present invention, all references as cited are incorporated by reference in their entireties. In the Figures:

FIG. 1 shows the heterodimer structure of c-FLIP$_L$ and caspase-8 used for virtual screening for the discovery of FLIPins. (a) Model of heterodimer structure of c-FLIP$_L$ (shown in dark gray) and processed caspase-8-p43/p10 (shown in light gray) with a putative binding site for the compound according to the present invention. The compound binding site is shown as a gray surface (b) Superimposition of the crystal structure of the processed caspase-8 [PDB ID 4PRZ] on the heterodimer complex of procaspase-8/c-FLIP$_L$ [PDB ID 3H11] (c) Interaction of FLIPinBγ with binding site residues of the heterodimer complex; amino acid residues of c-FLIP$_L$ and caspase-8 are denoted in black and dark gray colors, respectively. Hydrogen bonds are depicted as green dotted lines. Amino acid residues are shown in line representation; Protein subunits are shown in cartoon representation: processed caspase-8 (light gray color), c-FLIP$_L$ (dark gray color). The preferred compound FLIPinBγ is shown in stick representation.

Figure 2:
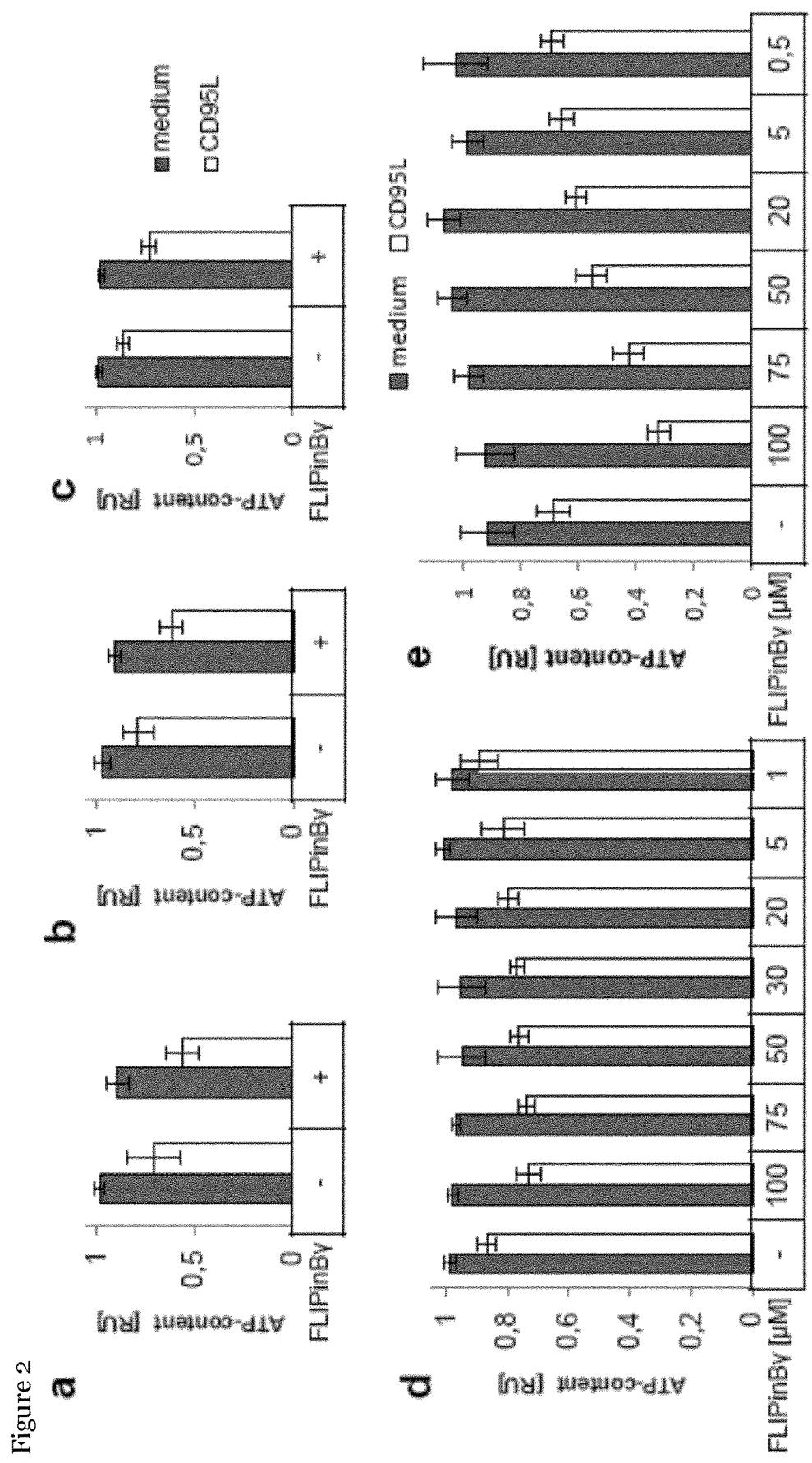
Figure 2:
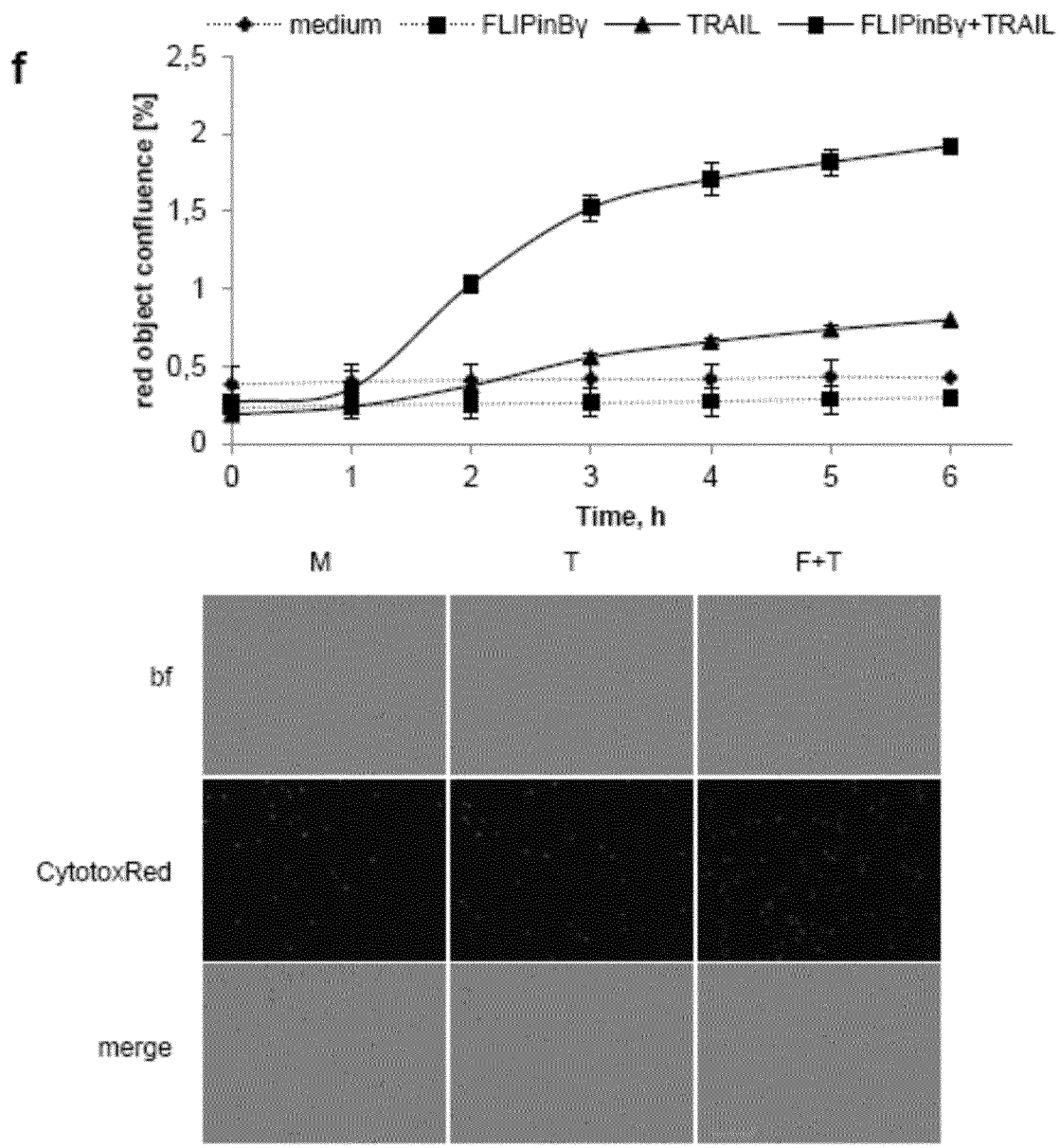

FIG. 2 shows that the co-treatment of FLIPinBγ/DL promotes the loss of cell viability in cancer cell lines. HeLa-CD95 cervical carcinoma cancer cells (a), T cell leukemia Jurkat cells (b), HeLa-CD95-FL (c-FLIP$_L$-overexpressing HeLa-CD95) cells (c, d) and acute myeloid leukemia MV-4-11 (e) cells were treated with the indicated concentration of FLIPinBγ for two hours and subsequently stimulated with CD95L (60 ng/mL in a+b; 238 ng/mL in c+d, 1000 in ng/mL e) for 6 hours (b-e) or 22 hours (a). Cell viability was measured using the Cell Titer-Glo®-Luminescent Cell Viability Assay estimating the ATP content. Mean and standard deviation are shown (n=3). (f) HeLa-CD95 cells were pretreated with 40 μM FLIPinBγ for two hours and stimulated with TRAIL (100 ng/mL). Dying cells were visualized with live cell imaging. Cells were stained with Cytotox Red Reagent. Fluorescence of dying cells was detected by the IncuCyte™ live cell analysis system (Essen Bioscience). In the lower part representative images after 4 hours of TRAIL stimulation are shown (bf=brightfield, M=medium, T=100 ng/mL TRAIL, F+T=40 μM FLIPinBγ+ 100 ng/mL TRAIL).

Figure 3:
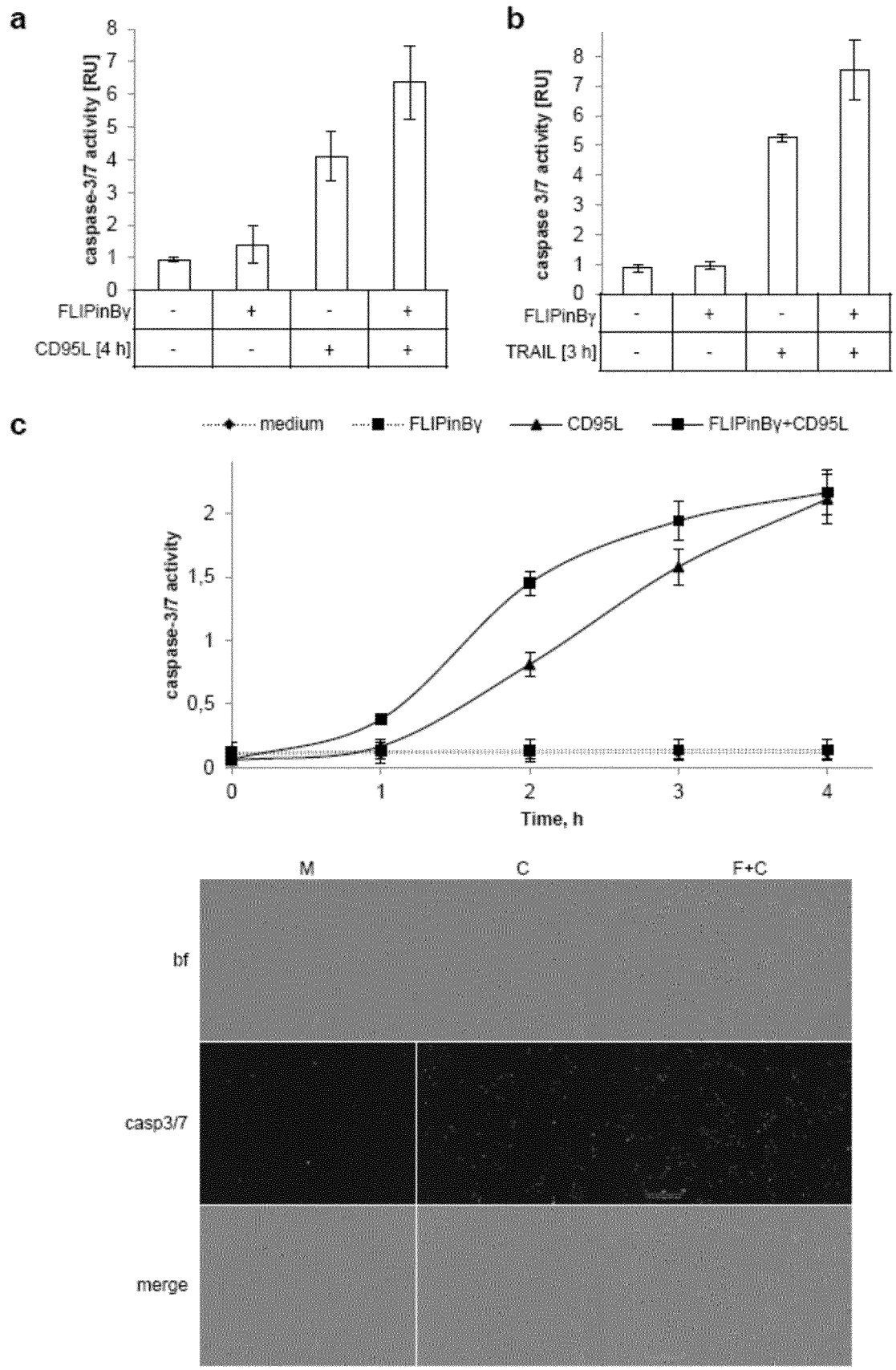

FIG. 3 shows that FLIPinBγ/DL co-treatment enhances caspase activity. (a+b) Jurkat cells were pre-treated with 20 μM FLIPinBγ for two hours and stimulated with CD95L (60 ng/mL) for four hours (a) or 100 ng/mL TRAIL for three hours (b). Caspase-3/-7-activity was determined by the Caspase-Glo3/7® Assay. Caspase activity is shown in RU. Mean and standard deviations are shown (n=3). (c) HeLa-CD95 cells were pre-treated with 40 μM FLIPinBγ for two hours and stimulated with CD95L (50 ng/mL). Caspase activity was visualized with live cell imaging. Cells were stained with Caspase-3/7 Green Apoptosis Assay Reagent. Fluorescence of dying cells was detected by the IncuCyte™ live cell analysis system (Essen Bioscience). In the lower part representative images after two hours of CD95L stimulation are shown (bf=brightfield, M=medium, C=50 ng/mL CD95L, F+C=40 μM FLIPinBγ+50 ng/mL CD95L).

Figure 4:
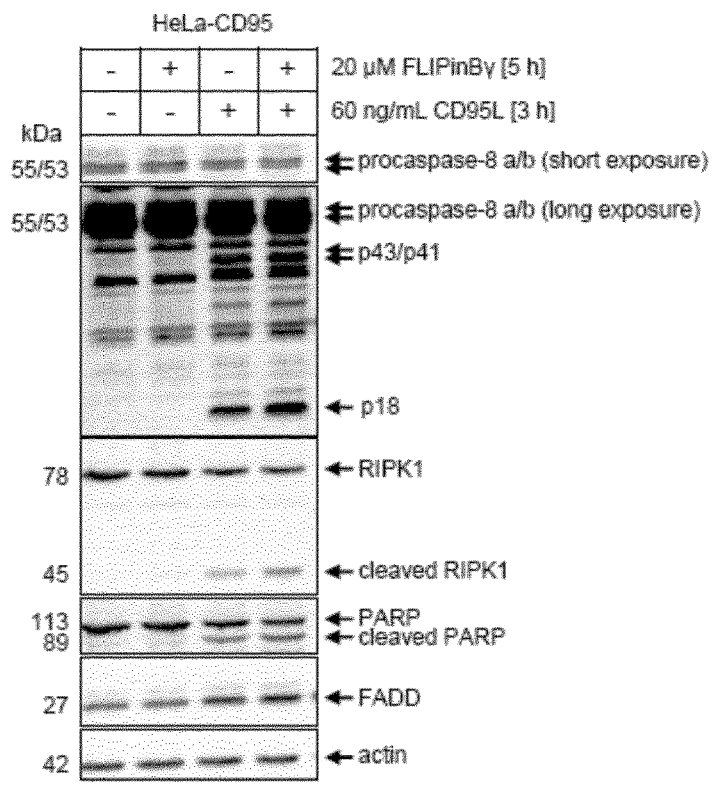
Figure 4:
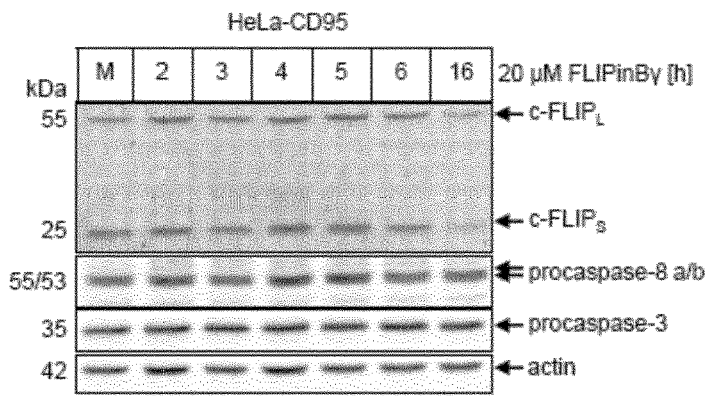
Figure 4:
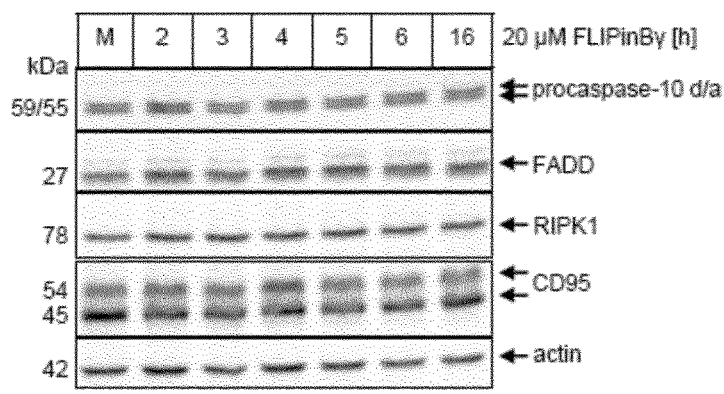

FIG. 4 shows that FLIPinBγ/CD95L co-treatment enhances caspase activation. (a) HeLa-CD95 cells were pretreated with 20 μM FLIPinBγ for two hours, followed by stimulation with CD95L (60 ng/mL) for three hours. Total cellular lysates were analyzed by Western Blot using the indicated antibodies. One representative experiment out of three independent experiments is shown. (b) HeLa-CD95 cells were treated with 20 μM FLIPinBγ for up to 16 hours. Total cellular lysates were analyzed by Western Blot using the indicated antibodies. Actin was used as loading control.

Figure 5:
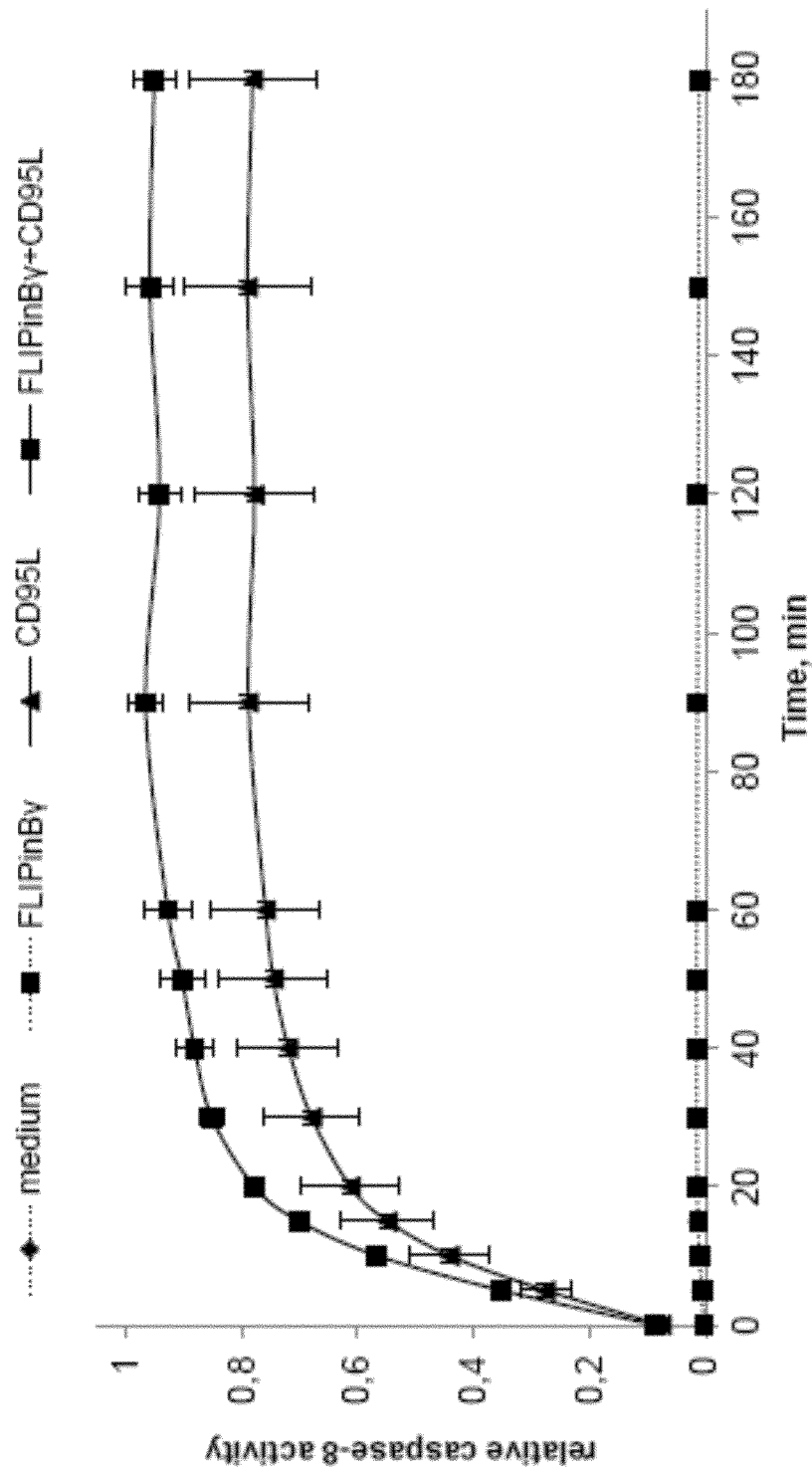

FIG. 5 shows that FLIPinBγ increases caspase-8 activity at the DISC. (a) Scheme presenting the proposed mechanism of FLIPinBγ action: FLIPinBγ binds to the caspase-8/c-FLIP$_L$ complex after initial processing of procaspase-8 to p43 and p10, which leads to the enhancement of caspase-8 activity in the p43/p10/FLIPinBγ/c-FLIP$_L$ complex. (b) HeLa-CD95 cells were pre-incubated with or without 20 μM FLIPinBγ for two hours, followed by stimulation with 60 ng/mL CD95L for three hours. CD95-DISC-IPs were analyzed by Caspase-Glo®-8-Assay. (c) HeLa-CD95 cells were stimulated with 60 ng/mL CD95L for three hours. CD95-DISC-IPs were analyzed by Western Blot analysis and probed for the indicated proteins. Actin was used as loading control. One representative experiment out of three is shown. (BC=control IP without antibody).

Figure 6:
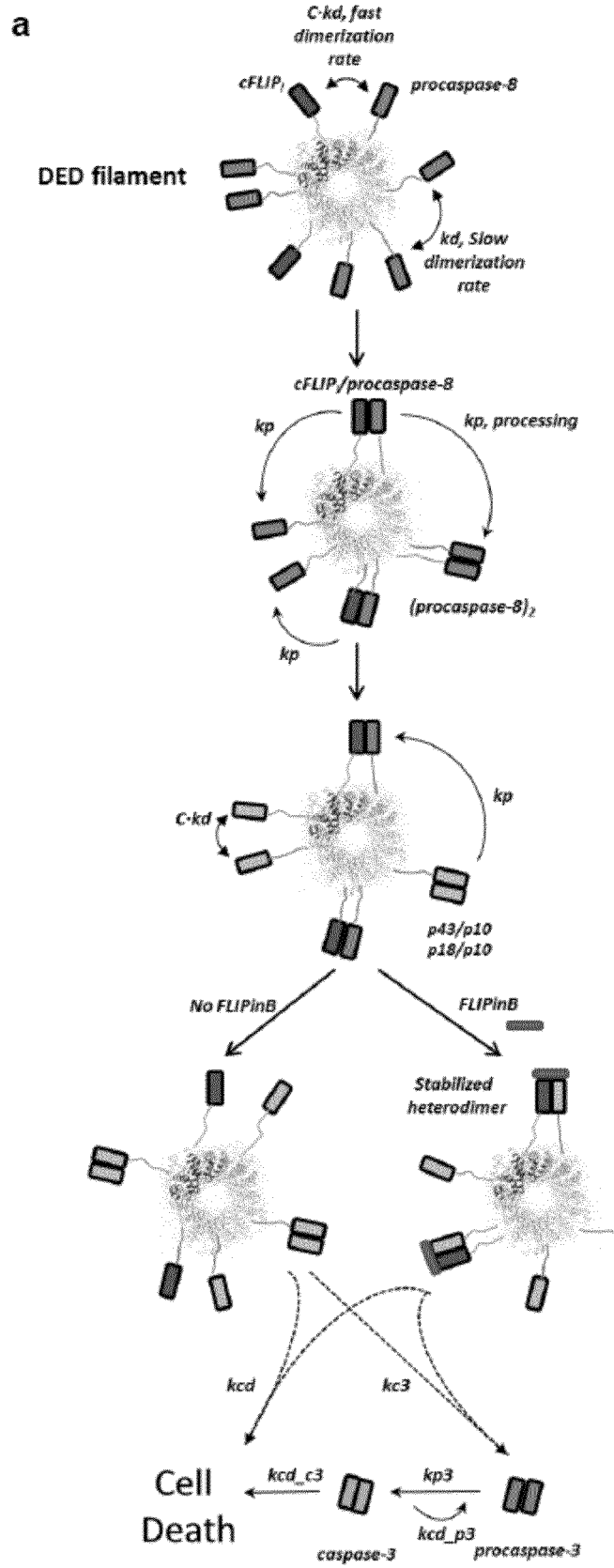
Figure 6:
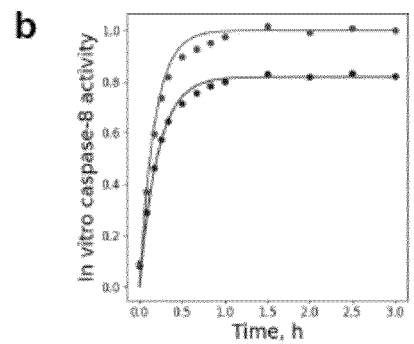
Figure 6:
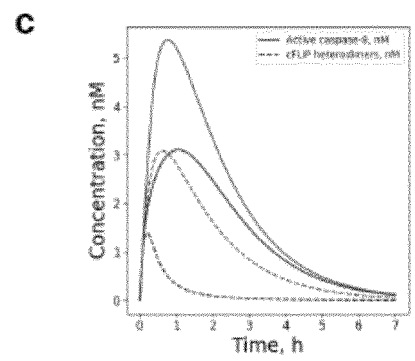
Figure 6:
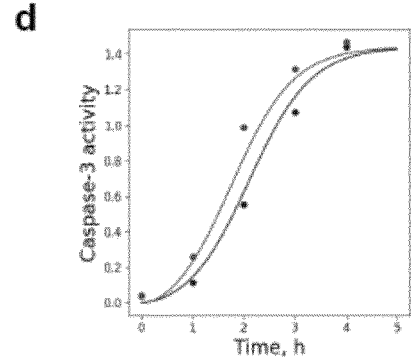
Figure 6:
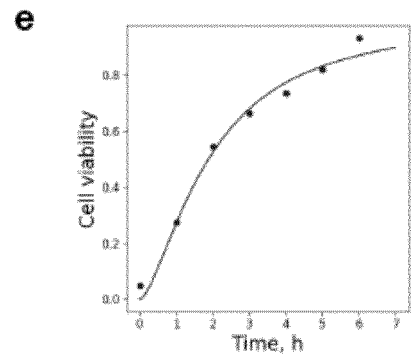

FIG. 6 shows modeling caspase-8 activation at the DISC/DED filament upon action of FLIPinBγ. (a) The topology of ODE model describing the activation of caspase-8 in the DED filament. kd—dimerization rate for procaspase-8 dimer; C·kd—dimerization rate for c-FLIP$_L$/procaspase-8 and caspase-8/caspase-8 dimers; kp—processing rate; kcd and kc3 rates for cell death substrate cleavage by caspase-8 and caspase-3, respectively. kc3, kc3_p3 rates of procaspase-3 cleavage by caspase-8 and caspase-3 respectively. (b-e) Simulations of the model and experimental data used for the model training. Lanes present model simulations, while points experimentally measured values. Treatment with CD95L is marked in blue, while the co-treatment CD95L/FLIPinBγ is shown in red.

Figure 7:
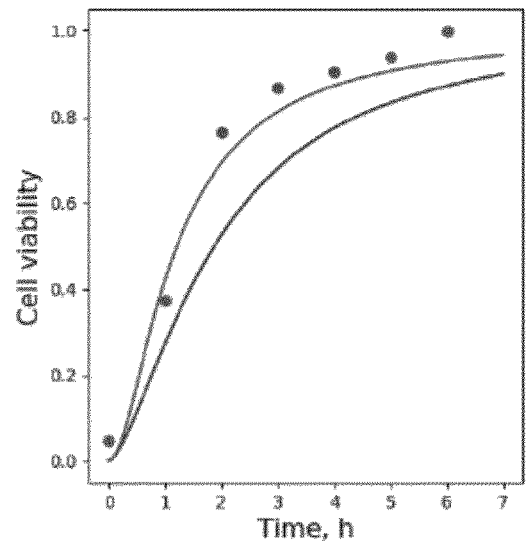
Figure 7:
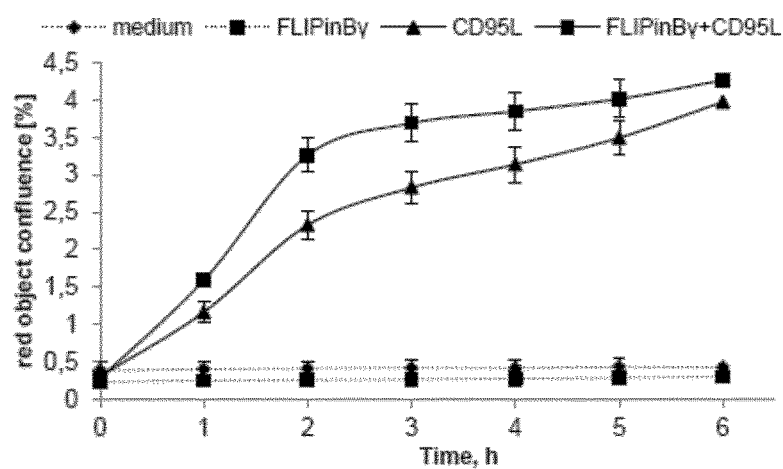
Figure 7:
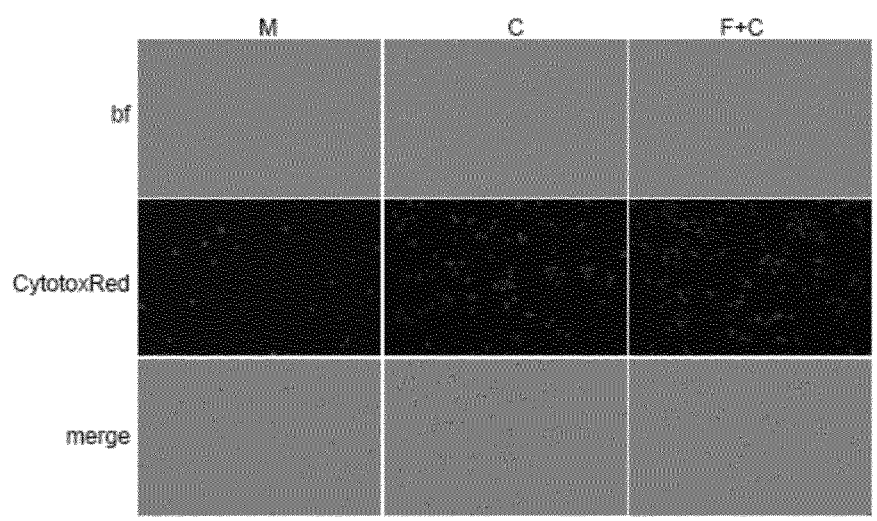

FIG. 7 shows model predictions and validation of FLIPinBγ action. (a) Simulations for cell death. Stimulation with CD95L is marked in blue, while the cotreatment CD95L/FLIPinBγ is shown in red. (b). HeLa-CD95 cells were pretreated with 40 μM FLIPinBγ for two hours and stimulated with CD95L (50 ng/mL). Dying cells were visualized with live cell imaging. Cells were stained with Cytotox Red Reagent. Fluorescence of dying cells was detected by the IncuCyte™ live cell analysis system (Essen Bioscience). In the lower part representative images after 4 hours of CD95L stimulation are shown (bf=brightfield, M=medium, C=50 ng/mL CD95L, C+F=40 μM FLIPinBγ+ 50 ng/mL CD95L).

EXAMPLES

Material and Methods

Virtual Screening—Virtual screening (VS) was carried out using the Glide molecular docking software (Friesner et al., 2004, 2006) from the Schrödinger Small Molecule Drug Discovery Suite 2015-1 (Schrödinger, Inc). Molecular docking was performed in the standard-precision (SP) and extra-precision (XP) modes. Prior to VS, protein structures were processed using the 'Protein preparation wizard module' in the Schrödinger Suite 2015-1 (Madhavi Sastry et al., 2013). Protein minimization was carried out using 'MacroModel' from the Schrödinger Suite 2015-1 and OPLS_2005 force field. VS was performed using the ZINC12 library of commercially available compounds prepared for molecular docking, which contains more than 16 million purchasable compounds (Irwin et al., 2012; Sterling and Irwin, 2015). At the first step VS was executed using Glide in the standard precision mode selecting about 100,000 compounds with the best Glide SP scoring function values. The next round of VS was performed in the XP mode resulting in a selection of compounds with the best Glide XP scoring function values for further visual inspection and selection of final hits for experimental validation. Additionally, the inventors applied the same virtual screening pipeline for 3770 active substances from Pubchem Bioassay Database (AID 624356), which contains the results of HTS directed on identification of small molecule compounds sensitizing TRAIL through caspase-8 pathway. This allowed the inventors to select two more compounds, FLIPinQ and FLIPinR.

Cell lines—Human cervical cancer HeLa-CD95 cells (Neumann et al., 2010) (CD95-overexpressing cells) and HeLa-CD95-FL cells (CD95/c-FLIP$_L$-overexpressing cells) were maintained in DMEM/Ham's (Merck Millipore, Germany) supplemented with 10% heat-inactivated fetal calf serum, 1% Penicillin-Streptomycin and 0.0001% Puromycin in 5% $CO_2$. Human acute myeloid leukemia MV-4-11 cells and T lymphoma Jurkat cells were maintained in RPMI 1640 (Thermo Fisher Scientific Inc., USA) supplemented with 10% heat-inactivated fetal calf serum and 1% Penicillin-Streptomycin in 5% $CO_2$.

Antibodies and Reagents—The following antibodies were used for Western Blot analysis: polyclonal anti-caspase-3 antibody (#9662), polyclonal anti-PARP antibody (#9542), monoclonal anti-RIPK1 XP antibody (#3493), polyclonal anti-actin antibody (A2103, Sigma-Aldrich, Germany), polyclonal anti-CD95 antibody (sc-715), polyclonal anti-mCherry antibody (ab183628), monoclonal anti-caspase-10 antibody (MO59-3), monoclonal anti-FADD antibody (clone 1C4), monoclonal anti-caspase-8 antibody (clone C15) and monoclonal c-FLIP antibody (clone NF6). Horseradish peroxidase-conjugated goat anti-mouse IgG1, -2a, -2b, goat anti-rabbit and rabbit anti-goat were from Santa Cruz (California, USA). Recombinant TRAIL (Killer-TRAIL™) and recombinant CD95L (SuperFasLigand™) were from Enzo Life Sciences, Germany. The monoclonal anti-APO-1 antibody (mouse-IgG3) was used for immunoprecipitations (IPs). All chemicals were of analytical grade and purchased from Merck (Darmstadt, Germany) or Sigma (Germany). The anti-APO-1, C15, NF6 and 1C4 antibodies were a kind gift of Prof. P. H. Krammer (DKFZ, Heidelberg). Recombinant LZ-CD95L was produced as described (Fricker et al., 2010).

Analysis of total cell lysates by Western Blot analysis— The Western Blot analysis of total cellular lysates was performed in accordance to the inventors' previous reports (Schmidt et al., 2015).

CD95 DISC-IP—The CD95 DISC-IP (Immunoprecipitation) from $5\times10^6$ HeLa-CD95 cells were done as described before (Pietkiewicz et al., 2015). In addition, DISC-IPs were washed four times with PBS, which was followed by Western Blot analysis or caspase-8 activity assays.

Caspase-8 activity assay—Each of protein A beads samples with CD95 DISC-IPs were resuspended in 95 μL of CHAPS-Buffer (50 mM HEPES pH=7.2; 50 mM NaCl; 10 mM EDTA; 5% Glycerin; 10 mM DTT, 0.1% CHAPS) and transferred into a 96-well plate. Caspase-8 activity was measured according to manufacturer's instructions (Caspase-Glo® 8 Assay, Promega, Germany). Every condition was performed in duplicate. The luminescence intensity was analyzed by a microplate reader Infinite M200pro (Tecan, Switzerland).

Cell viability quantification by ATP assay—50 μL of the CellTiter-Glo® solution was added to each well and measurements were performed according to manufacturer's instructions (CellTiter-Glo® Luminescent Cell Viability Assay, Promega, Germany). The luminescence intensity was analyzed by a microplate reader Infinite M200pro (Tecan, Switzerland). The viability of untreated cells was taken as one relative unit (RU). Every condition was performed in duplicate.

Caspase-3/7 activity assay—Caspase activity was measured by adding 50 μL of the Caspase-Glo®3/7 solution to each well. The luminescence intensity was analyzed by a microplate reader Infinite M200pro (Tecan, Switzerland) according to manufacturer's instructions (Caspase-Glo® 3/7 Assay, Promega, Germany). The caspase activity of non-treated cells was taken as one relative unit (RU). Every condition was performed in duplicate.

Cell death detection using IncuCyte™ live cell imaging— HeLa-CD95 cells in a 96 well plate ($5\times10^3$ cells/well) were pre-incubated with FLIPinBγ for 2 hours. Subsequently cells were stimulated with CD95L (50 ng/mL). To monitor cell death, cells were treated with IncuCyte™ Cytotox Red Reagent (1:4000) and Caspase-3/7 Green Apoptosis Assay Reagent (1:5000). The cells were imaged every hour by IncuCyte® ZOOM (Essen BioScience, Michigan) with a lox objective for a period of 6 hours. Every condition was performed in triplicate. Data were analyzed by the IncuCyte® ZOOM Software (2016A).

Modeling—Ordinary differential equations (ODEs) were used to model caspase-8 activation at the DISC with or without FLIPinBγ. In brief, the model was fitted to cell viability data, caspase-3 activity assays and in vitro caspase-8 activity after immunoprecipitation of DISC complex. In vitro caspase-8 activity was estimated from the rate of caspase-8 substrate cleavage, assuming that the caspase-8 substrate is present in excess.

Parameter fitting was done using the differential evolution method implemented in scipy.optimize.differential_evolution (Storn and Price, 1997). The Chi-square objective function based on deviation between model data and experimental data points was minimized to adjust parameter values.

Identifability analysis of parameters was carried out by implementing the profile likelihood method (Raue et al., 2009). Profile likelihoods for each parameter were evaluated by fixing corresponding parameters in a wide range of values, while re-optimizing all other parameters. 95% finite sample confidence intervals for the parameters were estimated.

Virtual Screening Identified Compounds Targeting c-FLIP (FLIPins)

A 'closed' conformation of the unprocessed L2' loop of procaspase-8 in the procaspase-8/c-FLIP$_L$ heterodimer was suggested to be crucial for its pro-apoptotic function, due to its stabilizing effect on the active center of caspase-8. In the 'closed' conformation, the side chains of amino acid residues of the unprocessed L2' loop occupy a groove on the c-FLIP$_L$ protein located between the β6 and α3 regions (β6/α3 groove) (Yu, Jeffrey and Shi, 2009). The switch of the L2' loop from a 'closed' to an 'open' conformation due to the L2 loop cleavage is expected to abolish the interactions within the β6/α3 groove of c-FLIP$_L$ and subsequently diminished the activity of the heterodimer. In this regard, the L2 loop cleavage leads to the generation of caspase-8-p43 and p10 cleavage products resulting in a complex comprising caspase-8-p43/p10 and c-FLIP$_L$ (denoted thereafter p43/p10/c-FLIP$_L$). Accordingly, the inventors assumed that if the β6/α3 groove will be occupied with a rationally designed small molecule mimicking the stabilizing effect of the L2' loop in a 'closed' conformation, it would rescue the activity of the p43/p10/c-FLIP$_L$ complex (FIG. 1a). In order to identify such compounds a virtual screening was performed.

To carry out the virtual screening, the structure of the p43/p10/c-FLIP$_L$ complex with the L2' loop in an 'open' conformation had to be computed. The structure of the p43/p10/c-FLIP$_L$ complex was derived from two previously obtained structures: the crystal structure of procaspase-8/c-FLIP$_L$ heterodimer of [PDB ID 3H11] (Yu, Jeffrey and Shi, 2009) and the structure of the p18 subunit of caspase-8 [PDB ID 4PRZ] (Vickers et al., 2014). The latter was used to obtain information on the structure of caspase-8 with the L2' loop in an 'open' conformation. The structure of the p18 and p10 parts of caspase-8 in p43/p10/c-FLIP$_L$ complex was predicted based on the structural superimposition of p18 structure [PDB ID $_4$PRZ] on the structure of procaspase-8 [PDB ID 3H11] followed by structural minimization (FIG. 1b). During the structure preparation water molecules from the crystal structure [PDB ID 3H11] located on the interface between procaspase-8 and c-FLIP$_L$ were kept, assuming that they play a role in complex stabilization. The generated 3D structure of the p43/p10/c-FLIP$_L$ complex was used for virtual screening (FIG. 1b).

Structural rearrangements in the course of the transformation from the 'closed' to the 'open' conformation of the L2' loop might lead to formation of a cavity on the binding interface of p43/p10/c-FLIP$_L$ complex according to in silico model (FIG. 1a). Therefore, the inventors expected that virtual screening would allow to identify compounds binding within this cavity to c-FLIP$_L$, thereby imitating the stabilizing effect of the L2' loop in a 'closed' conformation and leading to an increase in caspase-8 activity. As a result of the inventors' virtual screening, 5000 compounds with the best scoring function values were selected for further visual inspection. Visual verification was aimed at filtering of possible docking artifacts as well as at selection of compounds able to mimic key interactions observed in the L2 loop in the procaspase-8/c-FLIP$_L$ heterodimer structure. In this regard, the key criterion was the possibility of a compound to form a hydrogen bond with the carbonyl oxygen of Ser318 of c-FLIP$_L$, that was supposed to mimic the interaction between R376 of procaspase-8 with c-FLIP$_L$ in the procaspase-8/c-FLIP$_L$ heterodimer. Finally, the inventors selected suitable compounds termed FLIPins (FLIP inhibitors) for in vitro experimental tests.

FLIPinB/FLIPinBγ Enhances CD95L-/TRAIL-Mediated Loss of Cell Viability

As an initial experimental screening, the effect of FLIPins was examined by measuring the viability of Jurkat cells upon stimulation with FLIPin/CD95L in comparison with CD95L-only treatment. FLIPins that showed significant loss of viability upon their administration to Jurkat cells were not further considered. The compound designated as "FLIPinB" showed the best properties in the initial selection. Hence, its effects on CD95L- or TRAIL-induced cell death were further exploited in Jurkat, HeLa-CD95 (HeLa cells overexpressing CD95) (Neumann et al., 2010) and HeLa-CD95-FL (HeLa-CD95 cells overexpressing c-FLIP$_L$) cells. Administration of FLIPinB in Jurkat and HeLa-CD95 cells enhanced CD95L- and TRAIL-induced loss of cell viability and increased caspase activity. High levels of c-FLIP$_L$ are associated with resistance to DR-mediated apoptosis (Fricker et al. 2010). Accordingly, FLIPinB administration allowed to overcome the resistance of HeLa-CD95-FL cells to CD95L. These data provide the first evidence that the compound FLIPinB promotes CD95L- and TRAIL-induced loss of cell viability and caspase activation.

Subsequently, the structural properties of FLIPinB were further optimized using computer design methods. In order to construct a water soluble compound and improve its binding affinity to the caspase-8/c-FLIP$_L$ heterodimer, several optimization steps were introduced. This included the substitution of benzene in biphenyl and benzylsulfamic groups by pyridine expecting an increased binding to Arg337 and Trp466 in the side chains of c-FLIP$_L$ (FIG. 1c). The modification of the FLIPinB structure led to the small molecule FLIPinBγ, which contains the core element of FLIPinB. Introduction of side chains did not perturb the binding of FLIPinBγ to c-FLIP$_L$. The key interactions observed in the predicted FLIPinBγ/c-FLIP$_L$/p43/p10-caspase-8 complex are shown in the FIG. 1c. Importantly, the phenyl-pyrimidine ring occupies a cavity formed between the β6-sheet strands and the α3-helix of c-FLIP$_L$. FLIPinBγ forms two hydrogen bonds with the carbonyl group of Ser318 and a water molecule from the structure [PDB ID 3H11], which was kept for the virtual screening.

Importantly, the same interaction features are observed for the L2' loop in the procaspase-8/c-FLIP$_L$ complex. Additionally, the sulfonamide group is able to form hydrogen bonds with the hydroxyl group of Thr407 of c-FLIP$_L$ and caspase-8 carbonyl oxygen of E396 (FIG. 1c), replacing corresponding water molecule observed in the c-FLIP$_L$ heterodimer structure [PDB ID 3H11]. Remarkably, FLIPinBγ occupies Dithiane Diol binding cavity, according to reference crystal structures [PDB ID 4PRZ], what is likely beneficial for its binding free energy.

The designed small compound FLIPinBγ efficiently promoted a loss of cell viability in a dose- and time-dependent manner induced by CD95L in several cell lines including HeLa-CD95, Jurkat, HeLa-CD95-FL and MV-4-11 cells (FIG. 2a-e). These observations were supported by measuring cell death in HeLa-CD95 cells via live cell imaging using the IncuCyte technology (FIG. 20. In particular, cell death was detected using Cytotox Red, a dye which penetrates into dying cells with a compromised plasma membrane, providing the possibility to detect dying cells (FIG. 2f). Importantly, FLIPinBγ enhanced TRAIL-induced cell death, which was most prominent in the first hours after TRAIL treatment (FIG. 2f). Taken together, these experiments have demonstrated that the optimized compound FLIPinBγ promotes CD95L- and TRAIL-mediated loss of cell viability.

FLIPinBγ Enhances CD95L-/TRAIL-Mediated Caspase Activity

To ensure that FLIPinBγ promotes DL-mediated cell death via the apoptotic branch of the pathway the inventors analyzed its effects on caspase activity. Both FLIPinBγ/CD95L and FLIPinBγ/TRAIL co-treatment led to an increase of caspase-3/7 activity in Jurkat cells, compared to CD95L-treatment only (FIG. 3a, b). This was consistent with the analysis of caspase-3/7 activity with live cell imaging, which showed an increase in caspase-3/7 activity in single cells upon FLIPinBγ/CD95L and FLIPinBγ/TRAIL co-administration in Hela-CD95 cells (FIG. 3c). These data were further supported by Western Blot analysis, demonstrating that FLIPinBγ increases CD95L-induced cleavage of procaspase-8 to p18, RIPK1 and PARP (FIG. 4a). In this regard, a slight increase of RIPK1 cleavage indicated that FLIPinBγ might act via increasing caspase-8 activity, because RIPK1 isone of the caspase-8 substrates. Collectively, these data demonstrate that FLIPinBγ enhances caspase activation induced by DLs and that it acts on the apoptotic branch of the pathway.

c-FLIP proteins are characterized by a short half-life, which plays a central role in the regulation of their inhibitory action via fine-tuning of their intracellular concentration. The binding of FLIPinBγ to c-FLIP$_L$ might cause a conformational change leading to recruitment of putative DUB and subsequent c-FLIP$_L$ proteosomal degradation. In order to check if FLIPinBγ triggers a decrease of c-FLIP$_L$ levels in the cell and thereby induces apoptosis, the inventors analyzed whether the addition of FLIPinBγ to HeLa-CD95 cells changes the level of c-FLIP$_L$ (FIG. 4b). Time-dependent analysis of c-FLIP$_L$ levels by Western Blot demonstrated no influence of FLIPinBγ on c-FLIP$_L$ expression in the first hours after its administration (FIG. 4b). Thus, it was concluded that FLIPinBγ does not act via modulating the protein level of c-FLIP$_L$.

FLIPinBγ Acts Via Enhancement of Caspase-8 Activity at the DISC

DISC is a central platform for procaspase-8 activation. The predicted in silico mechanism of the FLIPinBγ effect involves the increased activity of procaspase-8/c-FLIP$_L$ heterodimer directly at the DISC. The suggested mechanism of FLIPinBγ action assumes that it binds to the procaspase-8/c-FLIP$_L$ complex after initial processing of procaspase-8 to p43 and p10 proteolytic fragments (FIG. 5a). The initial processing is expected to lead to a structural rearrangement of L2' loop from a 'closed' to an 'open' conformation, leading to emergence of a cavity at the complex interface and subsequent destabilization of the complex. The inventors assume that FLIPinBγ occupies the position of the L2' loop of procaspase-8 in the 'closed' conformation, which leads to the stabilization of the complex and rescue of caspase-8 activity in the p43/p10/c-FLIP$_L$ complex (FIG. 5a).

To test this hypothesis, CD95 DISC was immunoprecipitated from HeLa-CD95 cells with or without pre-treatment with FLIPinBγ using anti-CD95 (anti-APO-1) antibodies. Subsequently, the caspase-8 activity in the immunoprecipitates (IPs) was analysed using Caspase-8-Glo assay (FIG. 5b-c). DISC-IPs contained all core components of the DISC: CD95, FADD, procaspases-8 and 10 and their cleavage products (FIG. 5b). Co-treatment with FLIPinBγ increased caspase-8 activity at the DISC indicating that FLIPinBγ acts directly at the DISC by specifically increasing the caspase-8 activity (FIG. 5c). This experimental analysis further supports the computational predictions on the mechanism of FLIPinBγ.

Validation of the Cell Response to FLIPinBγ Treatment with a Computational Model In order to obtain detailed quantitative insights into the mechanism of FLIPinBγ function at the DED chain, the inventors used the cutting edge technology of mathematical modeling. To this end, a biochemical model of procaspase-8 activation at the DED filament has been created based on ODEs. The topology of the model included the formation of the homo-(procaspase-8/procaspase-8) and heterodimers (procaspase-8/c-FLIP$_L$) at the DED chains/filaments (FIG. 6a). After homo- and heterodimerization procaspase-8 undergoes autocatalytic activation in the DED filament which is followed by intra- and intermolecular processing of the dimers into the p43 and p10. This is accompanied by the caspase-8-mediated cleavage of procaspase-3 to caspase-3 and its subsequent activation leading to cell death. The ratios between procaspase-8 and c-FLIP at the DISC were based on quantitative proteomics analysis performed in the inventors' previous work and indicating substoichiometric amounts of c-FLIP in the DED filament with the ratio of 1 to 10 (c-FLIP to procaspase-8) (Schleich et al., 2012). This subsequently results in the decreased ratios of procaspase-8/c-FLIP$_L$ heterodimers to procaspase-8/procaspase-8 homodimers. The initial binding constants and related parametrization were based on the inventors' previous models of the DISC generated in HeLa-CD95 cells (Fricker et al., 2010).

The generated model was trained and validated with experimental data for caspase-8 activity at the DISC and caspase-3/7 activity in the total cellular lysates (FIG. 6b-e). The modeling predicted that FLIPinBγ would stabilize p43/p10/c-FLIP$_L$ complex up to four hours after CD95L stimulation resulting in its sustained activity over this period of time (FIG. 6c). Indeed, the in silico simulations have shown that the concentration of the p43/p10/c-FLIP$_L$ complex increases from 1 to 3 nM within the first hours after addition of CD95L (FIG. 6c). This in turn results in the subsequent increase of the concentration of active caspase-8 upon addition of FLIPinBγ for 4 h after stimulation (FIG. 6c). This prediction was fitting well to the experimental data on caspase activation and finally provided the explanation why the effects of FLIPinBγ on caspase activity are only detectable in the first hours after DL stimulation.

To test how the model would compute the timing of cell death upon addition of FLIPinBγ the simulations for the apoptosis induction with 60 ng/ml of CD95L with or without FLIPinBγ were performed. The model has predicted the increase in a rate of cell death within the first four hours after stimulation, which disappeared at later time points (FIG. 7a). Modeling predictions were validated by measuring cell death in HeLa-CD95 cells via live cell imaging using the IncuCyte technology as described previously (FIG. 7b). In accordance with in silico predictions FLIPinBγ enhanced CD95L-induced cell death in vitro in the first hours after CD95L co-treatment (FIG. 7b).

Taken together, the inventors' modeling approach fully support the mechanism of FLIPinBγ action manifesting in the FLIPinBγ-mediated increase of the stability of heterodimer and thereby prolonging its "catalytic life" at the DED filament.

REFERENCES AS CITED

Bentele, M., et al. (2004). Mathematical modeling reveals threshold mechanism in CD95-induced apoptosis. The Journal of cell biology 166(6), 839-851.

Bucur, O., et al. (2015). A novel caspase 8 selective small molecule potentiates TRAIL-induced cell death. Scientific Reports 5(1), 989.

Dickens, L. S., et al. (2012). A Death Effector Domain Chain DISC Model Reveals a Crucial Role for Caspase-8 Chain Assembly in Mediating Apoptotic Cell Death. Molecular Cell 47(2), 291-305.

Fricker, N., et al. (2010). Model-based dissection of CD95 signaling dynamics reveals both a pro- and antiapoptotic role of c-FLIPL. The Journal of Cell Biology 190(3), 377-389.

Fu, T.-M., et al. (2016). Cryo-EM Structure of Caspase-8 Tandem DED Filament Reveals Assembly and Regulation Mechanisms of the Death-Inducing Signaling Complex. Molecular Cell 64(2), 236-250.

Golks, A., et al. (2005). c-FLIPR, a new regulator of death receptor-induced apoptosis. The Journal of biological chemistry 280(15), 14507-14513.

Golks, A., et al. (2006). The c-FLIP-NH$_2$ terminus (p22-FLIP) induces NF-kappaB activation. The Journal of experimental medicine 203(5), 1295-1305.

Hardy, J. A., et al. (2004). Discovery of an allosteric site in the caspases. *National Academy of Sciences* 101(34), 12461-12466.

Hughes, M. A., et al. (2009). Reconstitution of the Death-Inducing Signaling Complex Reveals a Substrate Switch that Determines CD95-Mediated Death or Survival. Molecular Cell 35(3), 265-279.

Hughes, M. A., et al. (2016). Co-operative and Hierarchical Binding of c-FLIP and Caspase-8: A Unified Model Defines How c-FLIP Isoforms Differentially Control Cell Fate. Molecular Cell 61(6), 834-849.

Irwin, J. J., et al. (2012). ZINC: a free tool to discover chemistry for biology. Journal of chemical information and modeling 52 (7), 1757-1768.

Krammer, P. H., Arnold, R. and Lavrik, I. N. (2007). Life and death in peripheral T cells. Nature reviews. Immunology 7(7), 532-542.

Krueger, A., et al. (2001). Cellular FLICE-inhibitory Protein Splice Variants Inhibit Different Steps of Caspase-8 Activation at the CD95 Death-inducing Signaling Complex. Journal of Biological Chemistry 276 (23), 20633-20640.

Lavrik, I. N. (2014). Systems biology of death receptor networks: live and let die. Cell death & disease 5, p. e1259.

Lavrik, I. N. and Krammer, P. H. (2012). Regulation of CD95/Fas signaling at the DISC. Cell death and differentiation 19(1), 36-41.

Madhavi Sastry, G., et al. (2013). Protein and ligand preparation: parameters, protocols, and influence on virtual screening enrichments. Journal of Computer-Aided Molecular Design 27(3), 221-234.

Micheau, O., et al. (2002). The long form of FLIP is an activator of caspase-8 at the Fas death-inducing signaling complex. The Journal of biological chemistry 277(47), 45162-71.

Neumann, L., et al. (2010). Dynamics within the CD95 death-inducing signaling complex decide life and death of cells. Molecular Systems Biology 6

Oztürk, S., Schleich, K. and Lavrik, I. N. (2012). Cellular FLICE-like inhibitory proteins (c-FLIPs): fine-tuners of life and death decisions. Experimental cell research 318 (11), 1324-1331.

Pietkiewicz, S., et al. (2015). Combinatorial treatment of CD95L and gemcitabine in pancreatic cancer cells induces apoptotic and RIP1-mediated necroptotic cell death network. Experimental Cell Research 339(1), 1-9.

Raue, A., et al. (2009). Structural and practical identifiability analysis of partially observed dynamical models by exploiting the profile likelihood. Bioinformatics 25(15), 1923-1929.

Richard A. Friesner, et al. (2004). Glide: A New Approach for Rapid, Accurate Docking and Scoring. 1. Method and Assessment of Docking Accuracy. American Chemical Society.

Richard A. Friesner, et al. (2006). Extra Precision Glide: Docking and Scoring Incorporating a Model of Hydrophobic Enclosure for Protein-Ligand Complexes. American Chemical Society.

Roberts, A. W., et al. (2016). Targeting BCL2 with Venetoclax in Relapsed Chronic Lymphocytic Leukemia. New England Journal of Medicine 374(4), 311-322.

Scaffidi, C., et al. (1999) The role of c-FLIP in modulation of CD95-induced apoptosis. The Journal of biological chemistry 274 (3), 1541-1548.

Scheer, J. M., Romanowski, M. J. and Wells, J. A. (2006). A common allosteric site and mechanism in caspases. PNAS 103(20), 7595-7600.

Schleich, K., et al. (2016). Molecular architecture of the DED chains at the DISC: regulation of procaspase-8 activation by short DED proteins c-FLIP and pro-caspase-8 prodomain. Cell Death and Differentiation 23(4), 681-694.

Schleich, K., et al. (2012). Stoichiometry of the CD95 death-inducing signaling complex: experimental and modeling evidence for a death effector domain chain model. Molecular cell 47(2), 306-319.

Schmidt, J. H., Pietkiewicz, S., Naumann, M. and Lavrik, I. N. (2015). Quantification of CD95-induced apoptosis and NF-κB activation at the single cell level. Journal of Immunological Methods 423, 12-17.

Schoeberl, B., et al. (2017). Systems biology driving drug development: from design to the clinical testing of the anti-ErbB3 antibody seribantumab (MM-121). npj Systems Biology and Applications 3(1), 16034.

Sterling, T. and Irwin, J. J. (2015) 'ZINC 15—Ligand Discovery for Everyone. Journal of Chemical Information and Modeling 55(11), 2324-2337.

Storn, R. and Price, K. (1997). Differential Evolution—A Simple and Efficient Heuristic for global Optimization over Continuous Spaces. Journal of Global Optimization 11(4), 341-359.

Vickers, C. J., et al. (2014). Selective Inhibition of Initiator versus Executioner Caspases Using Small Peptides Containing Unnatural Amino Acids. ACS Chemical Biology 9(10), 2194-2198.

Yu, J. W., Jeffrey, P. D. and Shi, Y. (2009). Mechanism of procaspase-8 activation by c-FLIPL. Proceedings of the National Academy of Sciences of the United States of America 106(20), 8169-8174.

The invention claimed is:

1. A compound, wherein said compound is 2-[[4-(4-pyridyl)benzoyl]amino]ethyl 3-(3-pyridylmethylsulfamoyl)benzoate according to formula III

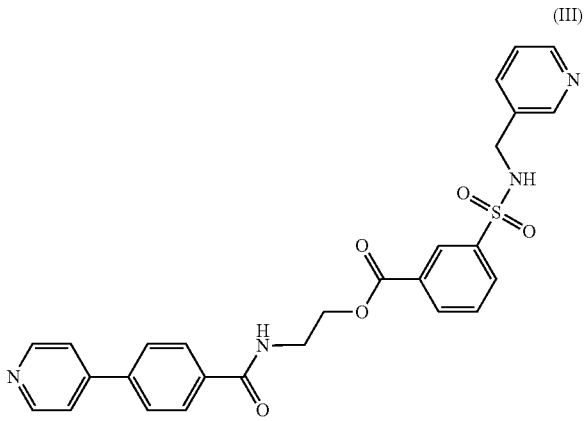 [SMILES: O=C(NCCOC(=O)c1cccc(S(=O)(=O)NCc2cccnc2)c1)c1ccc(-c2ccncc2)cc1]

(III)

or a pharmaceutically acceptable salt thereof.

2. A pharmaceutical composition comprising an effective amount of the compound according to claim 1, together with a pharmaceutically acceptable carrier.